United States Patent
Zhou et al.

(10) Patent No.: US 9,385,853 B2
(45) Date of Patent: Jul. 5, 2016

(54) METHOD AND APPARATUS FOR COORDINATED MULTI-NODE TRANSMISSION

(71) Applicant: Huawei Technologies Co., Ltd., Shenzhen, Guangdong (CN)

(72) Inventors: Yongxing Zhou, Beijing (CN); Jingyuan Sun, Beijing (CN); Liang Xia, Beijing (CN); David Mazzarese, Beijing (CN); Mingyu Zhou, Beijing (CN); Xiaotao Ren, Beijing (CN); Jiayin Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 135 days.

(21) Appl. No.: 14/202,537

(22) Filed: Mar. 10, 2014

(65) Prior Publication Data
US 2014/0192744 A1    Jul. 10, 2014

Related U.S. Application Data

(63) Continuation of application No. PCT/CN2012/081208, filed on Sep. 10, 2012.

(30) Foreign Application Priority Data

Sep. 10, 2011    (CN) .......................... 2011 1 0268236

(51) Int. Cl.
*H04W 4/00* (2009.01)
*H04L 5/00* (2006.01)
(Continued)

(52) U.S. Cl.
CPC .............. *H04L 5/0073* (2013.01); *H04B 7/024* (2013.01); *H04B 7/0626* (2013.01); *H04L 5/0032* (2013.01); *H04W 24/08* (2013.01); *H04W 72/1226* (2013.01)

(58) Field of Classification Search
CPC ....................................................... H04B 7/024
See application file for complete search history.

(56) References Cited

U.S. PATENT DOCUMENTS

2011/0013710 A1*  1/2011  Xiao ............................. 375/260
2011/0026473 A1*  2/2011  Luo et al. ..................... 370/329
(Continued)

FOREIGN PATENT DOCUMENTS

CN    101282564 A    10/2008
CN    101854233 A    10/2010
(Continued)

OTHER PUBLICATIONS

"Study on Coordinated Multi-Point Operation for LTE", Texas Instruments, 3GPP TSG RAN WG1 #63bis, Jan. 17-21, 2011, 2 pages.
(Continued)

*Primary Examiner* — Huy D Vu
*Assistant Examiner* — Kevin Cunningham

(57) ABSTRACT

Embodiments of the present invention provide a method and an apparatus for coordinated multi-node transmission The method includes: acquiring, by a user equipment, channel state indicator information of each coordinating node; feeding back, by the user equipment, all information or a part of information in the acquired channel state indicator information to a base station, so that each coordinating node performs, according to the channel state indicator information that has been fed back, scheduling on the user equipment and/or one or more other user equipments served by each coordinating node; and if the user equipment is scheduled, receiving, by the user equipment, scheduling result notification information sent by the base station, and receiving, by the user equipment according to the scheduling result notification information, data transmitted by a base station that corresponds to a coordinating node serving the user equipment. The present invention is applicable to a radio communications system.

23 Claims, 7 Drawing Sheets

---

101. A UE acquires channel state indicator CSI (Channel Status Indicator) information of each coordinating node 102. The UE feeds back all information or a part of information in the acquired CSI information to a base station, so that each coordinating node performs, according to the CSI information that has been fed back, scheduling on the UE and/or another UE served by each coordinating node 103. The UE receives scheduling result notification information sent by the base station 104. The UE receives, according to the scheduling result notification information, data transmitted by a base station that corresponds to a coordinating node serving the UE

(51) Int. Cl.
*H04B 7/02* (2006.01)
*H04B 7/06* (2006.01)
*H04W 72/12* (2009.01)
*H04W 24/08* (2009.01)

(56) References Cited

U.S. PATENT DOCUMENTS

| | | |
|---|---|---|
| 2011/0034175 A1* | 2/2011 | Fong et al. ............ 455/450 |
| 2012/0149428 A1* | 6/2012 | Yang ..................... 455/524 |
| 2013/0021925 A1* | 1/2013 | Yin et al. .............. 370/252 |
| 2014/0066116 A1 | 3/2014 | Gao et al. |

FOREIGN PATENT DOCUMENTS

| | | |
|---|---|---|
| CN | 102013952 A | 4/2011 |
| CN | 102083223 A | 6/2011 |
| CN | 102149124 A | 8/2011 |
| WO | WO 2010148531 A1 * | 12/2010 |
| WO | WO 2011/022733 A2 | 2/2011 |
| WO | WO 2011/033556 A1 | 3/2011 |

OTHER PUBLICATIONS

"Considerations on control schemes for CoMP scheduling", Mitsubishi Electric, 3GPP TSG RAN WG1 #64 meeting, Feb. 21-25, 2011, 3 pages.

* cited by examiner

101. A UE acquires channel state indicator CSI (Channel Status Indicator) information of each coordinating node 102. The UE feeds back all information or a part of information in the acquired CSI information to a base station, so that each coordinating node performs, according to the CSI information that has been fed back, scheduling on the UE and/or another UE served by each coordinating node 103. The UE receives scheduling result notification information sent by the base station 104. The UE receives, according to the scheduling result notification information, data transmitted by a base station that corresponds to a coordinating node serving the UE

FIG. 1

1021. The UE measures interference on a first-category resource element (RE, Resource Element)

1022. The UE acquires a location of a second-category RE

1023. The UE measures interference on the second-category RE

1024. The UE obtains equivalent interference according to the interference on the first-category RE and the interference on the second-category RE

FIG. 2

METHOD AND APPARATUS FOR COORDINATED MULTI-NODE TRANSMISSION

CROSS-REFERENCE TO RELATED APPLICATION

This application is a continuation of International Application No. PCT/CN2012/081208, filed on Sep. 10, 2012, which claims priority to Chinese Patent Application No. 201110268236.X, filed on Sep. 10, 2011, both of which are hereby incorporated by reference in their entireties.

TECHNICAL FIELD

The present invention relates to the field of communications technologies, and in particular, to a method and an apparatus for coordinated multi-node transmission.

BACKGROUND

With the development of communications technologies, a new type of network deployment, namely, a heterogeneous network (Heterogeneous Network, HetNet), is gradually introduced into radio networks. In the heterogeneous network, both a macro station and a micro station may be deployed, where a range covered by the macro station is called a macro cell, a range covered by the micro station is called a micro cell, and a same time/frequency resource is multiplexed within coverage of all stations, thereby providing gains resulting from cell splitting and resource multiplexing. However, meanwhile, because the same time/frequency resource is multiplexed, mutual interference is generated between cells, and the interference severely affects receive channel quality of some user equipments (User Equipment, UE). It is well-known that in a radio communications system, throughput of a UE is related to receive channel quality of the UE, and therefore, how to optimize throughput of the system is a problem that needs to be solved.

In the prior art, a manner, such as using almost blank subframes (Almost Blank Subframe, ABS) or cell range extension (Cell Range Extension, CRE), may be used to optimize the throughput of the system. However, any one of these optimization manners has poor flexibility, that is, fails to perform a quite flexible adjustment on the communications system with respect to different scheduling goals, namely, different scenarios or requirements, for example, the scenario or the requirement that throughput of a UE served by a macro node is preferentially improved, or the scenario or the requirement that throughput of a UE served by a micro node is preferentially improved.

SUMMARY

A main objective of embodiments of the present invention is to provide a method, an apparatus, and a system for coordinated multi-node transmission, which can perform a flexible adjustment on a communications system according to different scheduling goals.

The embodiments of the present invention use the following technical solutions to achieve the foregoing objective:

A method for coordinated multi-node transmission includes:
acquiring, by a user equipment, channel state indicator information of each coordinating node;
feeding back, by the user equipment, all information or a part of information in the acquired channel state indicator information to a base station, so that each coordinating node performs, according to the channel state indicator information that has been fed back, scheduling on the user equipment and/or one or more other user equipments served by each coordinating node; and
if the user equipment is scheduled:
receiving, by the user equipment, scheduling result notification information sent by the base station; and
receiving, by the user equipment according to the scheduling result notification information, data transmitted by a base station that corresponds to a coordinating node serving the user equipment.

A method for coordinated multi-node transmission includes:
receiving channel state indicator information of coordinating nodes that is fed back by a user equipment;
performing, according to the channel state indicator information that has been fed back, scheduling on the user equipment and/or one or more other user equipments served by each coordinating node;
sending scheduling result notification information to the scheduled user equipment according to a result of the scheduling; and
transmitting data to the scheduled user equipment according to the result of the scheduling.

A user equipment includes:
an acquiring unit, configured to acquire channel state indicator information of each coordinating node;
a feedback unit, configured to feed back all information or a part of information in the acquired channel state indicator information to a base station, so that each coordinating node performs, according to the channel state indicator information that has been fed back, scheduling on the user equipment and/or one or more other user equipments served by each coordinating node; and
a receiving unit, configured to: if the user equipment is scheduled, receive scheduling result notification information sent by the base station, and receive, according to the scheduling result notification information, data transmitted by a base station that corresponds to a coordinating node serving the user equipment.

A base station includes:
a receiving unit, configured to receive channel state indicator information of coordinating nodes that is fed back by a user equipment;
a scheduling unit, configured to perform, according to the channel state indicator information that has been fed back, scheduling on the user equipment and/or one or more other user equipments served by each coordinating node;
a sending unit, configured to send scheduling result notification information to the scheduled user equipment according to a result of the scheduling; and
a transmitting unit, configured to transmit data to the scheduled UE according to the result of the scheduling.

After the foregoing technical solutions are used, according to the method, the UE, and the base station for coordinated multi-node transmission that are provided in the embodiments of the present invention, a manner in which multiple nodes provide a service in a coordinated manner is used; the UE feeds back CSI information, and each coordinating node performs scheduling on the UE and/or one or more other UEs served by each coordinating node; in one aspect, the UE can feed back channel state indicator information required for achieving a scheduling goal, so that the base station implements scheduling to achieve the scheduling goal; in another aspect, multi-node coordination is used to provide the service for the UE, and for the UE, a different coordinating node may transmit data for the UE at a certain period; therefore, each coordinating node is capable of performing scheduling according to a requirement of an expected scheduling goal and selectively serving UEs in a system. In this way, a flexible adjustment is performed on a communications system and the objective of flexible optimization of radio communications performance is achieved.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a flowchart of a method for coordinated multi-node transmission according to an embodiment of the present invention;

FIG. 2 is a flowchart of a method for coordinated multi-node transmission according to an embodiment of the present invention;

DETAILED DESCRIPTION

Figure 3:
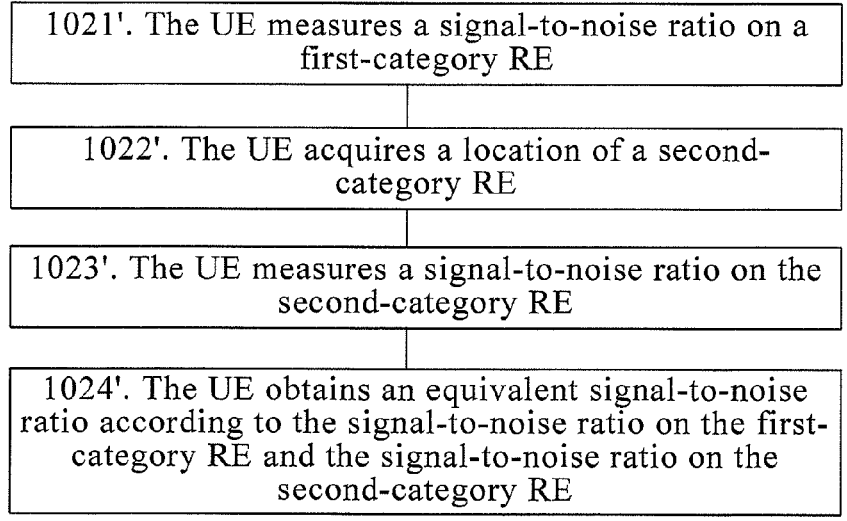
FIG. 3 is a flowchart of a method for coordinated multi-node transmission according to an embodiment of the present invention.

The following clearly describes the technical solutions in the embodiments of the present invention with reference to the accompanying drawings in the embodiments of the present invention.

It should be clear that, the described embodiments are merely a part rather than all of the embodiments of the present invention. All other embodiments obtained by a person of ordinary skill in the art based on the embodiments of the present invention without creative efforts shall fall within the protection scope of the present invention.

A brief introduction is firstly made to application scenarios of the embodiments of the present invention in order for a person skilled in the art to better understand the technical solutions in the embodiments of the present invention.

A radio network communications system to which a method for coordinated multi-node transmission in an embodiment of the present invention is applied may be a homogeneous or heterogeneous system. The radio network communications system includes several nodes and UEs, where the nodes include but are not limited to a cell, a base station, a remote radio head, a remote radio unit, a cell set or a node set, and the like. Each UE can be served by at least one node, that is, the at least one node transmits data directly or indirectly for the UE, where the directly transmitting, by the node, data for the UE refers to that data of the UE is sent by the node, and the indirectly transmitting, by the node, data for the UE refers to that data of the UE is not sent by the node, but data sending of the node may provide help for transmitting the data of the UE. In the embodiments of the present invention, the at least one node capable of serving each UE is called a coordinating node, where a node in the coordinating node that transmits physical-layer broadcast information for a UE is called a master node of the UE, or a node in the coordinating node that transmits physical-layer downlink control information for the UE is called a master node of the UE.

It should be noted that in the embodiments of the present invention, for each UE, its coordinating node may be preset to be at least one fixed node in the radio network communications system; and may also be selected by the master node for the UE and notified to the UE, or selected by the UE itself. The coordinating node selected in these two manners may be fixed and may also be changed in real time according to practical situations, for example, a network state of each node, which is not limited in the present invention.

The following describes in detail a method and an apparatus for coordinated multi-node transmission according to the embodiments of the present invention.

As shown in FIG. 1, an embodiment of the present invention provides a method for coordinated multi-node transmission. Based on a UE, the method includes the following steps:

101. The UE acquires channel state indicator CSI (Channel Status Indicator) information of each coordinating node.

Optionally, the CSI information includes various types of channel state information, for example, channel quality indicator CQI (Channel Quality Indicator) information, a signal-to-noise ratio, a channel feature vector, a channel capacity, or channel throughput.

102. The UE feeds back all information or a part of information in the acquired CSI information to a base station, so that each coordinating node performs, according to the CSI information that has been fed back, scheduling on the UE and/or one or more other UEs served by each coordinating node.

It should be noted that in this step, the base station that receives the CSI information fed back by the UE is a base station that corresponds to a master node of the UE, and the UE may forward, by using its master-node base station, CSI information of one or more other coordinating nodes to a base station that corresponds to the one or more other coordinating nodes.

Optionally, in this step, the UE may feed back all information in the CSI information acquired in step 101 to the base station, and the base station determines which CSI information is to be used. The UE may also perform initial selection and feed back a part of information in the CSI information acquired in step 101 to the base station, and specifically, the UE may perform initial selection according to an indicator of the base station or a preset rule and feed back only selected CSI information, for example, feeds back only channel state information required for achieving a scheduling goal.

It should be noted that no matter the UE feeds back all the information or the part of the information in the acquired CSI information to the base station, a resource identifier and/or a node identifier corresponding to the CSI information that has been fed back may all be implicitly fed back, that is, be implied in the CSI information that has been fed back. For example, by using preset correspondence between a CSI information field and a resource, CSI information in a certain field is CSI information of a resource corresponding to the field.

Certainly, the resource identifier or the resource identifier and the node identifier that corresponds to the CSI information that has been fed back may also be explicitly fed back, that is, be told to the base station directly by the UE; that is, the method for coordinated multi-node transmission in the present invention may further include:

feeding back, by the UE to the base station, at least one of the resource identifier and the node identifier that correspond to the CSI information that has been fed back.

It should be noted that when the node is not a cell, the node identifier is an identifier of the node or an identifier of a cell to which the node belongs; and when the coordinating node is a cell set or a node set, the node identifier is an identifier of the node set or an identifier of the cell set to which the node belongs.

It may be understood that in this scheduling process of each coordinating node, though the CSI information fed back by the UE is used, scheduling may not be performed on the UE, that is, a coordinating node serving the UE and a time/frequency resource are not allocated to the UE. If the UE is scheduled, the method for coordinated multi-node transmission in this embodiment further includes:

103. The UE receives scheduling result notification information sent by a base station.

After the scheduling, one coordinating node, namely, the master node, transmits physical-layer broadcast information or physical-layer downlink control information for the UE, and at least one coordinating node transmits data for the UE.

It should be noted that in this step, the base station that sends the scheduling result notification information is a base station that corresponds to the master node of the UE after the scheduling performed by each coordinating node, and the base station may be the same as or different from the base station that receives the CSI information before the scheduling.

A scheduling result notification message includes but is not limited to one or more of a node identifier of the coordinating node that transmits data for the UE, a location of a time/frequency resource, scrambling code information, demodulation pilot related information, and the like.

104. The UE receives, according to the scheduling result notification information, data transmitted by a base station that corresponds to the coordinating node serving the UE.

According to the method for coordinated multi-node transmission, a UE, and a base station that are provided in this embodiment of the present invention, a manner in which multiple nodes provide a service in a coordinated manner is used; the UE feeds back CSI information, and each coordinating node performs scheduling on the UE and/or one or more other UEs served by each coordinating node; in one aspect, the UE can feed back CSI information required for achieving a scheduling goal, so that the base station implements scheduling to achieve the scheduling goal; in another aspect, multi-node coordination is used to provide the service for the UE, and for the UE, a different coordinating node may transmit data for the UE at a certain period; therefore, each coordinating node is capable of performing scheduling according to a requirement of an expected scheduling goal and selectively serving UEs in a system. In this way, a flexible adjustment is performed on a communications system and the objective of flexible optimization of radio communications performance is achieved.

Optionally, the acquiring, by the UE, CSI information of each coordinating node in step 101 specifically includes:

measuring, by the UE, a channel state of each coordinating node; and acquiring, by the UE, the CSI information of each coordinating node according to the measured channel state.

The channel state includes interference, a signal-to-noise ratio, a channel capacity, channel throughput, or the like.

Using the acquiring, by the UE, CQI information of each coordinating node as an example, the UE firstly measures interference or a signal-to-noise ratio of each coordinating node, and then calculates the CQI information of each coordinating node according to the measured interference or signal-to-noise ratio.

To effectively improve accuracy of the CSI information acquired by the UE, preferably, in an embodiment of the present invention, the acquiring, by the UE, CSI information of each coordinating node in step 101 specifically includes:

measuring, by the UE, a channel state of each coordinating node, and performing interference compensation on the measured channel state; and acquiring, by the UE, the CSI information of each coordinating node according to the channel state on which the interference compensation has been performed.

Performing interference compensation on the measured channel state can make the channel state after the interference compensation closer to an actual channel state, thereby effectively improving the accuracy of the CSI information.

The step of measuring, by the UE, a channel state of each coordinating node, and performing interference compensation on the measured channel state is described in detail by also using the acquiring, by the UE, CQI of each coordinating node as an example.

In an embodiment of the present invention, as shown in FIG. 2, when the CSI information acquired by the UE is the CQI, step 102 specifically includes:

1021. The UE measures interference on a first-category resource element (RE, Resource Element).

The first-category RE is an RE at the same location as an interference reference signal of a coordinating node to be measured, and the coordinating node to be measured is a coordinating node whose channel state is to be measured.

The interference reference signal refers to a reference signal used for interference measurement and may specifically be a node-specific reference signal (CRS, Cell-specific Reference Signal), a channel state information-reference signal (CSI-RS, Channel State Information-Reference Signal), or the like, which is not limited herein.

1022. The UE acquires a location of a second-category RE.

The second-category RE is a part or all of REs apart from the first-category RE.

Preferably, the second-category RE is an RE that suffers heavy interference from one or more other coordinating nodes or an RE that suffers interference at an intensity an absolute value of a difference between which and an intensity of interference suffered by the first-category RE is greater than a certain threshold. The heavily-interfering coordinating node is at least one node that is among all coordinating nodes apart from the coordinating node to be measured and whose receive power value, for the UE, is greater than receive power values of the other coordinating nodes, for example, at least one node whose reference signal received power RSRP (Reference Signal Received Power) value is greater than RSRP values of the other coordinating nodes.

When the second-category RE is an RE that suffers heavy interference from the one or more other coordinating nodes, specifically, a manner in which the UE acquires the location of the second-category RE includes:

The UE may determine, according to a node identifier Cell ID of the heavily-interfering coordinating node and a Cell ID of an access point to be measured, whether a location of an RE of a node-specific reference signal CRS (Cell-specific Reference Signal) sent by the heavily-interfering coordinating node is the same as a location of an RE of a CRS sent by the coordinating node to be measured, and if they are different, the location of the RE of the CRS of the heavily-interfering coordinating node is a location of an RE, which suffers heavy interference, of the UE, namely, the location of the second-category RE; or the UE may also acquire, in a manner of demodulating a physical control format indicator channel PCFICH (Physical Control Format Indicator Channel)) of a heavily-interfering access point or receiving a notification of the base station, the number of symbols of a physical downlink control channel PDCCH (Physical Downlink Control Channel) of the coordinating node to be measured and the number of symbols of a PDCCH of the heavily-interfering coordinating node, and if the number of the symbols of the PDCCH of the heavily-interfering coordinating node is greater than the symbols of the PDCCH of the coordinating node to be measured, a location of an RE on which the heavily-interfering coordinating node sends the PDCCH and the coordinating node to be measured does not send the PDCCH is a location of an RE, which suffers heavy interference, of the UE, namely, the location of the second-category RE; or the UE may also directly obtain the location of the second-category RE in a manner of receiving a notification of the base station.

The foregoing three manners in which the UE acquires the location of the second-category RE are merely exemplary and do not set any limitation to the present invention.

1023. The UE measures interference on the second-category RE.

1024. The UE obtains equivalent interference according to the interference on the first-category RE and the interference on the second-category RE.

Optionally, the UE may perform weighted averaging on the interference on the first-category RE and the interference on the second-category RE, so as to obtain the equivalent interference.

For example, when the UE acquires CQI of the coordinating node to be measured, the interference measured on the first-category RE is I0, the interference measured on the second-category RE is I1, an equivalent interference I is obtained by performing weighted averaging on I0 and I1, and then CQI is obtained, where:

$$I = a*I0 + b*I1$$

a and b are weighting factors and may be fixed values, which are notified to the UE by the master-node base station or calculated by the UE according to the number of, power of, and the like of REs on which the heavily-interfering coordinating node causes heavy interference. Using the REs on which CRSs cause heavy interference as an example, the UE calculates the weighting factors according to the number of, the power of, and the like of the CRSs:

$$b = (P\_CRS - P\_PDSCH) * N\_CRS / N\_PDSCH$$

where P_CRS is average power of the CRSs, P_PDSCH is average power of physical downlink shared channels PDSCH (PDSCH Physical Downlink Shared Channel), N_CRS is the number of REs of the CRSs, N_PDSCH is the number of REs of the PDSCH, and in this case, a may be set to 1.

Certainly, the UE may also acquire, according to the interference on the first-category RE and the interference on the second-category RE, the equivalent interference by using other calculation methods, which is not limited in the present invention.

After acquiring the equivalent interference, the UE acquires the CQI information of each coordinating node according to the equivalent interference, thereby effectively improving accuracy of the CQI information of each coordinating node.

It may be understood that in an embodiment of the present invention, the UE may also measure the signal-to-noise ratio of each coordinating node and acquire the CQI by calculation of the signal-to-noise ratio. In this case, as shown in FIG. 3, step 102 may specifically include:

1021'. The UE measures a signal-to-noise ratio on a first-category RE.

1022'. The UE acquires a location of a second-category RE.

1023'. The UE measures a signal-to-noise ratio on the second-category RE.

For details about the first-category RE, the second-category RE, and how to acquire the location of the second-category RE, refer to the foregoing manners, and no further details are provided herein.

1024'. The UE obtains an equivalent signal-to-noise ratio according to the signal-to-noise ratio on the first-category RE and the signal-to-noise ratio on the second-category RE.

Specifically, the UE may obtain the equivalent signal-to-noise ratio similarly in a manner of weighted averaging or obtain the equivalent signal-to-noise ratio by performing a signal-to-noise ratio mapping on the signal-to-noise ratio on the first-category RE and the signal-to-noise ratio on the second-category RE, where, optionally, a mapping method may be an exponential effective signal-to-noise ratio mapping EESM (Exponential Effective SINR Mapping), a mutual information effective signal-to-noise ratio mapping MI-ESM (Mutual Information Effective SINR Mapping), or the like, which is not limited in the present invention.

After acquiring the equivalent signal-to-noise ratio, the UE acquires the CQI information of each coordinating node according to the equivalent signal-to-noise ratio, thereby effectively improving accuracy of the CQI information of each coordinating node.

In addition, in an embodiment of the present invention, the UE may also measure the signal-to-noise ratio on the first-category RE and then perform an adjustment on the signal-to-noise ratio on the first-category RE according to signal-to-noise ratio adjustment signaling delta_SNR received from the base station, so as to obtain the equivalent signal-to-noise ratio and then acquire the CQI information, where delta_SNR may be configured by the base station according to the number of and the power of REs of a CRS, a PDCCH, a PDSCH, or the like at the heavily-interfering access point. It should be noted that the signal-to-noise ratio adjustment signaling may be the same or different when the UE measures each coordinating node, and there may be one or more pieces of signal-to-noise ratio adjustment signaling received by the UE, where each piece of signal-to-noise ratio adjustment signaling corresponds to one or more coordinating nodes.

Further, in an embodiment of the present invention, the master-node base station of the UE may instruct the UE whether to perform interference compensation; that is, before the acquiring, by the UE, CSI information of each coordinating node, the method for coordinated multi-node transmission in the present invention further includes:

receiving, by the UE, measurement indicator information sent by the base station, where the measurement indicator information is used to indicate whether the UE performs interference compensation on the measured channel state.

The UE is capable of determining, according to the indicator information, whether to perform interference compensation on the measured channel state. Specifically, the measurement indicator information may be sent through high-layer signaling or sent through physical-layer dynamic signaling. Preferably, the measurement indicator information may be sent through UE-specific high-layer signaling or sent through a PDCCH that carries feedback triggering signaling. It should be noted that the measurement indicator information may be the same or different when the UE measures each coordinating node, and there may be one or more pieces of measurement indicator information received by the UE, where each piece of measurement indicator information corresponds to one or more coordinating nodes.

In addition, the UE may perform interference compensation on all measured channel states and may also perform interference compensation on only a part of the measured channel states, where the part of the channel states on which the interference compensation is performed may be predefined and may also be notified by the base station; that is, further, in an embodiment of the present invention, before the acquiring, by the UE, CSI information of each coordinating node, the method further includes:

receiving, by the UE, interference compensation resource information sent by the base station, where the interference compensation resource information is used to indicate interfering-node indicator information or a location of a resource for the UE to perform interference compensation, where the interfering-node indicator information indicates a coordinating node on which interference compensation needs to be performed; and after measuring the channel state of each coordinating node, performing, by the UE according to the interference compensation resource information, interference compensation on the measured channel state of a coordinating node or of the resource indicated in the interference compensation resource information, and not performing channel compensation on other channel states.

For example, if the interfering-node indicator information indicates that interference compensation needs to be performed on a first coordinating node, the UE performs interference compensation on a measured channel state of the first coordinating node according to the interfering-node indicator information.

In step 102, the UE may feed back all information in the CSI information acquired in step 101 to the base station, and the base station decides which CSI information is to be used; or the UE may also perform initial selection and feed back a part of information in the CSI information acquired in step 101 to the base station.

In an exemplary embodiment of the present invention, the method for coordinated multi-node transmission in the present invention further includes the following steps:

receiving, by the UE, selection reference parameters sent by the base station, where the selection reference parameters are mapped to a part of nodes or all of nodes among all coordinating nodes; and when the selection reference parameters are mapped to a part of nodes among all the coordinating nodes, for a coordinating node that does not have a corresponding selection reference parameter, determining, by the UE, 0 or a predefined value as its selection reference parameter.

For example, the UE has five coordinating nodes, and the base station may send the UE five selection reference parameters that are mapped to the five coordinating nodes, that is, each coordinating node has its own selection reference parameter; and the base station may also send the UE three selection reference parameters that are mapped to three nodes among the five coordinating nodes, and in this case, the UE may consider that selection reference parameters of the other two nodes among the five nodes are 0 or predefined values.

In this case, after step 101 and before step 102, the method for coordinated multi-node transmission in the present invention further includes:

selecting, by the UE according to the selection reference parameters and from the acquired CSI information of each coordinating node, CSI information that needs to be fed back to the base station; and subsequently, in step 102, feeding back, by the UE, the selected CSI information to the base station.

It may be understood that to tell the base station a resource or a coordinating node that corresponds to the CSI information fed back by the UE, the method in this embodiment of the present invention further includes:

feeding back, by the UE to the base station, at least one of a resource identifier and a node identifier that correspond to the selected CSI information.

In this embodiment of the present invention, a selection reference parameter is a reference parameter for the UE to select a serving node on different resources, or is called a reference bias. In this embodiment of the present invention, in the process where the UE feeds back CSI, the selection reference parameter is used to allow the UE to select, from the acquired CSI information and with respect to CSI information of different coordinating nodes that is on a same resource, information that is to be fed back to the base station, and specifically, allow the UE to select, from the acquired CSI information, on a same time/frequency resource block, of each coordinating node, CSI of one or more coordinating nodes for feedback, where nodes that correspond to CSI fed back on each time/frequency resource block may be the same and may also be different.

In this embodiment of the present invention, the selection reference parameters are in broad concept, and may be reference biases of different parameters and correspond to the channel state measured by the UE. For example, the measured channel state is a signal-to-noise ratio, a channel capacity, or channel throughput, and the selection reference parameters correspondingly are signal-to-noise ratio reference parameters, channel capacity reference parameters, or channel throughput reference parameters.

Optionally, the selection reference parameters may be CQI reference parameters, signal-to-noise ratio reference parameters, channel capacity reference parameters, or channel throughput reference parameters, and are preferably CQI reference parameters or signal-to-noise ratio reference parameters. Certainly, they may also be reference biases of other parameters.

Optionally, the selection reference parameters may be independently sent or jointly sent through cell-specific high-layer signaling, UE-specific high-layer signaling, or physical-layer dynamic signaling. Specifically, the selection reference parameters may be sent by any one of the following methods:

sending through node-specific high-layer signaling;
sending through the UE-specific high-layer signaling; and
sending through a PDCCH.

In joint sending through the node-specific high-layer signaling and the UE-specific high-layer signaling, the selection reference parameters received from the base station are obtained according to a selection reference parameter sent through the node-specific high-layer signaling and a selection reference parameter sent through the UE-specific high-layer signaling, for example, the selection reference parameters equal the selection reference parameter sent through the node-specific high-layer signaling plus the selection reference parameter sent through the UE-specific high-layer signaling.

In joint sending through the node-specific high-layer signaling and the PDCCH, the selection reference parameters received from the base station are obtained according to a selection reference parameter sent through the node-specific high-layer signaling and a selection reference parameter sent through the PDCCH, for example, the selection reference parameters equal the selection reference parameter sent through the node-specific high-layer signaling plus the selection reference parameter sent through the PDCCH.

In joint sending through the UE-specific high-layer signaling and the PDCCH, the selection reference parameters received from the base station are obtained according to a selection reference parameter sent through the UE-specific high-layer signaling and a selection reference parameter sent through the PDCCH, for example, the selection reference parameters equal the selection reference parameter sent through the UE-specific high-layer signaling plus the selection reference parameter sent through the PDCCH.

In joint sending through the node-specific high-layer signaling, the UE-specific high-layer signaling, and the PDCCH, the selection reference parameters received from the base station are obtained according to a selection reference parameter sent through the node-specific high-layer signaling, a selection reference parameter sent through the UE-specific high-layer signaling, and a selection reference parameter sent through the PDCCH, for example, the selection reference parameters equal the selection reference parameter sent through the node-specific high-layer signaling plus the selection reference parameter sent through the UE-specific high-layer signaling plus the selection reference parameter sent through the PDCCH.

In an embodiment of the present invention, specifically, the acquiring, by the UE, CSI information of each coordinating node in step 101 specifically includes:

measuring, by the UE, a channel state of each coordinating node; and acquiring, by the UE, the CSI information according to the measured channel state.

In this case, selecting, by the UE according to the selection reference parameters and from the acquired CSI information of each coordinating node, the CSI information that needs to be fed back to the base station includes the following steps:

acquiring, by the UE, the sum of channel state information of each coordinating node and a selection reference parameter that corresponds to each coordinating node;

sequencing, by the UE, the sums of channel state information and selection reference parameters of all coordinating nodes; and selecting, by the UE according to a result of the sequencing, CSI information of one or more coordinating nodes as the CSI information that needs to be fed back, where the sum of channel state information and a selection reference parameter of a selected coordinating node is greater than the sum of channel state information and a selection reference parameter of an unselected coordinating node.

It should be noted that if the UE has performed interference compensation when the UE acquires the CSI information, the channel state used when feedback information selection is performed is a channel state on which the interference compensation has been performed.

For ease of description, the selection reference parameters are all called CQI-biases below.

For example, as shown in Table 1, the UE acquires, on each sub-band, CSI of three coordinating nodes: node 1, node 2, and node 3; in the process of acquiring the CSI of each coordinating node on each sub-band, the UE measures a signal-to-noise ratio SINR of each coordinating node on each sub-band, and the UE receives a signal-to-noise ratio CQI-bias of each coordinating node from the base station, where a signal-to-noise ratio CQI-bias corresponding to node 1 is 1, a signal-to-noise ratio CQI-bias corresponding to node 2 is 1.5, and a signal-to-noise ratio CQI-bias3 corresponding to node 3 is 2; and it is assumed that the UE selects CSI of only one node on each sub-band for feedback, on sub-band 1, the sum of a signal-to-noise ratio SINR and the signal-to-noise ratio CQI-bias of node 1 is 13, the sum of a signal-to-noise ratio SINR and the signal-to-noise ratio CQI-bias of node 2 is 11.5, and the sum of a signal-to-noise ratio SINR and the signal-to-noise ratio CQI-bias of node 3 is 11, and therefore, the UE selects, on sub-band 1, CSI information of node 1 for feedback, and the selection is performed in a similar manner on one or more other sub-bands.

TABLE 1

|  |  | Sub-band 1 | Sub-band 2 | Sub-band 3 | Sub-band 4 | Sub-band 5 |
|---|---|---|---|---|---|---|
| Node 1 | SINR | 12 | 10 | 7 | 9 | 11 |
|  | CQI-bias | 1 | 1 | 1 | 1 | 1 |
|  | SINR + CQI-bias | 13 | 11 | 8 | 10 | 12 |
| Node 2 | SINR | 10 | 8 | 9 | 10 | 12 |
|  | CQI-bias | 1.5 | 1.5 | 1.5 | 1.5 | 1.5 |
|  | SINR + CQI-bias | 11.5 | 9.5 | 10.5 | 11.5 | 13.5 |
| Node 3 | SINR | 9 | 11 | 10 | 9 | 10 |
|  | CQI-bias | 2 | 2 | 2 | 2 | 2 |
|  | SINR + CQI-bias | 11 | 13 | 12 | 11 | 12 |
| Selection result |  | Node 1 | Node 3 | Node 3 | Node 2 | Node 2 |

It should be noted that in this embodiment of the present invention, for a same resource, the UE acquires CSI information of at least one coordinating cell; CSI information that is fed back by the UE for the same resource may be CSI information of one or more coordinating cells; and as to CSI information of several coordinating cells that is selected by the UE for the same resource according to CQI-biases, it may be predefined and may also be notified by the base station to the UE. Specifically, in an embodiment of the present invention, the method further includes:

receiving, by the UE, feedback indicator information sent by the base station or acquiring predefined feedback indicator information, where the feedback indicator information is used to indicate the number of coordinating nodes for which the UE needs to feed back CSI information or indicate a feedback threshold;

when the feedback indicator information indicates the number of coordinating nodes for which the UE needs to feed back CSI information, specifically, sequentially selecting, by the UE according to the result of the sequencing and in descending order of the sums of the channel state information and the selection reference parameters, CSI information of at least one coordinating node as the CSI information that needs to be fed back, where the number of the at least one coordinating node is the number indicated in the feedback indicator information, for example, when the feedback indicator information indicates that the number of the coordinating nodes for which the UE needs to feed back the CSI information is N, for the same resource, the UE selects, according to CQI-biases, CSI information of the N coordinating nodes for feedback; and when the feedback indicator information indicates the feedback threshold, specifically, sequentially selecting, by the UE according to the result of the sequencing and in descending order of the sums of the channel station information and the selection reference parameters, CSI information of at least one coordinating node as the CSI information that needs to be fed back, where a difference between the maximum value among the sums of channel state information and selection reference parameters of all coordinating nodes and the sum of the channel state information and a selection reference parameter of the at least one coordinating node is less than the feedback threshold, for example, assuming that the feedback indicator information indicates that the feedback threshold is 3, and for the same resource, the maximum value among the sums of the channel state information and the selection reference parameters of all the coordinating nodes is 10, the UE selects, according to the CQI-biases, CSI information of a coordinating node the sum of whose channel state information and selection reference parameter is greater than 7 for feedback.

It should be noted that in this embodiment of the present invention, as described in the foregoing examples, the CSI information of the at least one node that is selected according to the CQI-biases by and needs to be fed back by the UE may be sub-band CSI information of the at least one node, and apparently, the present invention is not limited thereto, and the CSI information of the at least one node that is selected by and needs to be fed back by the UE may also be wideband CSI information, or includes the wideband CSI information and the sub-band CSI information.

For example, for each sub-band, the UE selects, according to the CQI-biases, sub-band CSI information of at least one node for feedback; or the UE selects, according to the CQI-biases, a coordinating node for which CSI information needs to be fed back, and then calculates, for each node for which feedback needs to be performed, its Wideband CSI information for feedback, and optionally, calculates the Wideband CSI information only according to CSI information on a sub-band of the CSI information of the selected node for which feedback needs to be performed or CSI information that is on all sub-bands and corresponds to the node; or the UE jointly selects N sub-bands and feeds back the sub-band CSI information, and feeds back, for each node for which feedback needs to be performed, its Wideband CSI information; or the UE selects, according to the CQI-biases, a coordinating node for which CSI information needs to be fed back, selects, for each node for which feedback needs to be performed, M sub-bands and feeds back the sub-band CSI information, and feeds back, for each node for which feedback needs to be performed, its Wideband CSI information; and certainly, the UE may also select a node according to all sub-bands on which no CSI information is fed back, and then feed back wideband CSI information of the corresponding node; in this case, only one piece of wideband CSI information is fed back.

In this embodiment of the present invention, CQI-biases are introduced into the process where the UE feeds back CSI information, so that, in one aspect, the UE can feed back only a part of information in the CSI information of each coordinating node, thereby effectively reducing resource occupancy; in another aspect, the CQI-biases may allow the base station to flexibly control the UE to feed back CSI information of specified coordinating nodes, and then to perform scheduling by using a coordinating node for which the UE performs feedback as a scheduling node. In other words, the base station can purposefully control, according to the scheduling goal such as a requirement for optimizing throughput and by using the CQI-biases, the coordinating node for which the UE performs feedback, so that the coordinating node for which the UE performs feedback has a higher probability to serve UEs of all coordinating nodes, thereby achieving the scheduling goal and achieving the objective of flexible optimization of radio communications performance.

After step 102, that is, after the UE feeds back the selected CSI information to the base station and after each coordinating node performs scheduling, the base station, namely, the master-node base station can perform analysis on the result of the scheduling by using scheduling-related information exchanged between nodes, so as to determine whether the result of the scheduling satisfies a predefined scheduling goal; and if it is not satisfied, the base station may perform, according to the predefined scheduling goal, an adjustment on CQI-biases selected by the UE for feedback, which is not limited herein, for example, increase or decrease the CQI-biases, and for a specific example, adjust the original CQI-biases by a certain step each time, or multiply the original CQI-biases by a certain factor each time, and send the adjusted CQI-biases to the UE. Then further, after step 102, the method may further include:

receiving, by the UE, selection reference parameters that are sent by the base station and on which the base station performs an adjustment.

In a subsequent CSI feedback process, the UE selects, by using the adjusted CQI-biases, the CSI information that needs to be fed back to the base station.

In this way, the base station purposefully controls, by using the adjusted CQI-biases, the coordinating node for which the UE performs the feedback, so that the coordinating node for which the UE performs the feedback has a higher probability to serve UEs of all coordinating nodes, thereby achieving the predefined scheduling goal and achieving the objective of flexible optimization of radio communications performance.

For example, using the predefined scheduling goal that node-edge user throughput of a category-A node reaches x % of node-edge user throughput of a category-B node as an example, where the category-A node may be a Macro node and the category-B node may be a Pico node, a method for adjusting a CQI-bias is as follows:

In independent scheduling of each node, the master-node base station of the UE determines, by using information exchanged between the nodes, that the predefined scheduling goal is achieved, and in this case, when node-edge user throughput of node a (a category-A node) is less than x % of node-edge user throughput of node b (a category-B node), decreases a CQI-bias corresponding to node a and/or increases a CQI-bias corresponding to node b, which is equivalent to improving the CQI-bias of node a relative to node b, so that the UE has a higher probability to feed back CSI information of node b, that is, having a higher probability to allow node b to serve UEs of all coordinating nodes; otherwise, decreases the CQI-bias of node a relative to node b, so that the UE has a higher probability to feed back CSI information of node a, that is, having a higher probability to allow node a to serve UEs of all the coordinating nodes.

When an optimization goal is that average cell throughput of a category-B cell reaches y times (for example, 1.5 times) of average cell throughput of a category-A cell, whether the goal is achieved is determined according to information exchanged between cells. If average cell throughput of cell b (a category-B cell) is less than y times of average cell throughput of cell a (a category-A cell), a CQI-bias of cell a relative to cell b is decreased, so that a user at an edge of the two cells has a higher probability to select cell a to provide a service for the user; otherwise, the CQI-bias of cell a relative to cell b is increased, so that the user at the edge of the two cells has a higher probability to select cell b to provide a service for the user.

In addition, a case where throughput of a certain user reaches a certain threshold may be taken as the optimization goal, and when the optimization goal is not achieved and cell a is capable of providing larger throughput than a cell that currently serves the user, an adjustment may be performed on a CQI-bias of the user, for example, a CQI-bias of cell a relative to the current serving cell of the user is increased, so that cell a has a higher probability to serve the user, thereby increasing the throughput for the user.

After each coordinating node performs scheduling according to the CSI information sent by the UE and CSI information sent by one or more other UEs, if the UE is scheduled, the master-node base station of the UE sends a scheduling result notification message to the UE.

According to the result of the scheduling, one or more coordinating nodes may concurrently send a data information physical downlink shared channel PDSCH (Physical Downlink Shared Channel) to the UE, and when multiple coordinating nodes concurrently transmit a same PDSCH or different PDSCHs to the UE, if used time/frequency resources cannot be completely overlapped, the base station may indicate transmission of a corresponding PDSCH by using multiple pieces of downlink control information DCI (Downlink Control Information), for example, indicate a resource block and HARQ information that are used by each node to transmit data for the UE, or indicating that an SCID corresponding to a demodulation reference signal DMRS (Demodulation Reference Signal) is used; and if the used time/frequency resources are completely overlapped, the base station may indicate related information of multiple code words by using DCI that carries multiple code word indicators. In addition, when multiple pieces of DCI are concurrently sent to the UE, the base station needs to notify the UE and requires the UE to detect and receive the multiple pieces of DCI.

That is, optionally, step 103 specifically includes:

receiving, by the UE, one or more pieces of downlink control information that indicate data channel transmission, where the multiple pieces of downlink control information received by the UE indicate scheduling information for different coordinating nodes to transmit user data on a same carrier or different carriers, and a coordinating node that sends the downlink control information may be the same as or different from a coordinating node that transmits the user data;

or receiving, by the UE, downlink control information that indicates data channel transmission, where the downlink control information includes one or more code word indicators, multiple code words included in the downlink control information are used to indicate code word information for different coordinating nodes to transmit user data on a same carrier or different carriers, and a node that sends the downlink control information may be the same as or different from a node that transmits the user data.

In addition, one or more coordinating nodes may concurrently send a data information physical downlink shared channel PDSCH to the UE according to the result of the scheduling. Optionally, the base station needs to notify the UE of a node that transmits the data channel, namely, the PDSCH, for the UE, and/or demodulation pilot information of the data channel. In an embodiment of the present invention, receiving, by the UE, scheduling result notification information of the base station in step 103 specifically includes:

receiving, by the UE, node list indicator information and/or extension identifier information sent by the base station, where the node list indicator information is used to indicate a node that transmits a data channel for the UE, and the extension identifier information is used to indicate demodulation pilot information of the data channel.

Specifically, in this embodiment of the present invention, to send the node list indicator information and/or the extension identifier information, signaling, namely, a transmission indicator, used to bear the node list information and/or the extension identifier information may be added, and the base station sends the node list indicator information and/or the extension identifier information through the transmission indicator; in this case, the UE receives the node list indicator information and/or the extension identifier information that is sent by the base station through the transmission indicator. For example, dynamic signaling M1 may be added and used to send the node list indicator information, or dynamic signaling M2 may be added and used to send the node list indicator information and the extension identifier information. When the base station sends the node list indicator information and/or the extension identifier information through the transmission indicator, optionally, the base station needs to indicate, through high-layer signaling, that the transmission indicator is the node list indicator information and/or the extension identifier information. In addition, optionally, when the base station sends the node list indicator information and/or the extension identifier information through the transmission indicator, the base station needs to notify the UE whether the transmission indicator is sent, that is, the method in this embodiment of the present invention further includes:

receiving, by the UE, high-layer signaling, where the high-layer signaling indicates whether the transmission indicator is sent.

Certainly, the base station may also send the node list indicator information and/or the extension identifier information by multiplexing existing signaling, for example, a carrier indicator CIF (Carrier Indicator Field), and in this case, the UE receives the node list indicator information and/or the extension identifier information sent by the base station through the CIF. When the base station sends the node list indicator information and/or the extension identifier information through the CIF, the base station needs to notify the UE through high-layer signaling that the CIF is the node list indicator information and/or the extension identifier information, that is, the method in this embodiment of the present invention further includes:

receiving, by the user, the high-layer signaling, where the high-layer signaling is used to indicate that the carrier indicator is the node list indicator information and/or the extension identifier information.

Optionally, a mapping between the carrier indicator signaling or predefined signaling and the node list indicator information and/or the extension identifier information may be indicated through a bitmap mapping (bitmap) or a state mapping, or indicated through a bitmap mapping or a state mapping that is indicated in the high-layer signaling.

For example, signaling for transmitting the node list indicator information is three bits, and a bitmap manner for mapping the signaling is as follows: When the $0^{th}$ bit is 1, it indicates that a node whose node number is 0 is the node that transmits the data channel for the UE, and when the $0^{th}$ bit is 0, it indicates the node whose node number is 0 is not the node that transmits the data channel for the UE; when the $1^{st}$ bit is 1, it indicates that a node whose node number is 1 is the node that transmits the data channel for the UE, and when the $1^{st}$ bit is 0, it indicates that the node whose node number is 1 is not the node that transmits the data channel for the UE; and so on. Certainly, it may also be as follows: When the $0^{th}$ bit is 0, it indicates that the node whose node number is 0 is the node that transmits the data channel for the UE, and when the $0^{th}$ bit is 1, it indicates that the node whose node number is 0 is not the node that transmits the data channel for the UE; when the $1^{st}$ bit is 0, it indicates that the node whose node number is 1 is the node that transmits the data channel for the UE, and when the $1^{st}$ bit is 1, it indicates that the node whose node number is 1 is not the node that transmits the data channel for the UE; and so on.

For example, signaling for transmitting the node list indicator information is three bits, a value Value of the signaling may be 0 to 7, and as shown in Table 2, a state mapping manner of the signaling may be as follows: When the value of the signaling is 0, it indicates that a number of the node that transmits the data channel for the UE is 0; when the value of the signaling is 1, it indicates that the number of the node that transmits the data channel for the UE is 1; and so on.

TABLE 2

| Value | 0 | 1 | 2 | 3 | 4 | 5 | 6 | 7 |
|---|---|---|---|---|---|---|---|---|
| Number of a node that transmits the data channel | 0 | 1 | 2 | 0, 1 | 0, 2 | 1, 2 | 0, 1, 2 | Reserved |

For example, signaling for transmitting the node list indicator information and the extension identifier information is three bits, a value Value of the signaling may be 0 to 7, and as shown in Table 3, a state mapping manner of the signaling may be as follows: When the value of the signaling is 0, it indicates that a number of the node that transmits the data channel for the UE is 0 and an extension identifier is 0; when the value of the signaling is 1, it indicates that the number of the node that transmits the data channel for the UE is 1 and the extension identifier is 1; and so on.

TABLE 3

| Value | 0 | 1 | 2 | 3 | 4 | 5 | 6 | 7 |
|---|---|---|---|---|---|---|---|---|
| Number of a node that transmits the data channel | 0 | 1 | 2 | 0, 1 | 0, 2 | 1, 2 | 0, 1, 2 | Reserved |
| Extension identifier | 0 | 1 | 2 | 3 | 3 | 3 | 3 | 3 |

Further, in an embodiment of the present invention, the base station may also send carrier indicator information and the node list indicator information and/or the extension identifier information through a hybrid indicator, that is, the method in this embodiment further includes:

receiving, by the UE, the carrier indicator information and the node list indicator information and/or the extension identifier information that are sent by the base station through the hybrid indicator.

Optionally, the base station needs to indicate, through high-layer signaling, that the hybrid indicator is the carrier indicator information and the node list indicator information and/or the extension identifier information, that is, the method in this embodiment of the present invention further includes:

receiving, by the UE, high-layer signaling, where the high-layer signaling indicates that the hybrid indicator is the carrier indicator information and the node list indicator information and/or the extension identifier information.

In addition, optionally, when the base station sends the carrier indicator information and the node list indicator information and/or the extension identifier information through the hybrid indicator, the base station needs to notify the UE whether the hybrid indicator is sent, that is, the method in this embodiment of the present invention further includes:

receiving, by the UE, high-layer signaling, where the high-layer signaling indicates whether the hybrid indicator is sent.

Similarly, mappings between the hybrid indicator and the carrier indicator information and between the hybrid indicator and the node list indicator information and/or the extension identifier information may be indicated through a bitmap mapping or a state mapping, or indicated through a bitmap mapping or a state mapping that is indicated in the high-layer signaling.

Further, in an embodiment of the present invention, the method further includes:

receiving, by the user equipment, multi-node high-layer signaling, where the multi-node high-layer signaling includes at least one of the following information:

a node identifier corresponding to each coordinating node, the number of pilot ports corresponding to each coordinating node, a pilot location corresponding to each coordinating node, and a data-channel starting location corresponding to each coordinating node.

In this way, after the UE receives the node list indicator information sent by the base station, according to the node list indicator information and the multi-node high-layer signaling received by the UE, the UE determines a node identifier of the node that transmits the data channel for the UE, determines the number of pilot ports of and a pilot location of the node that transmits the data channel for the UE, and/or determines a data-channel starting location of the node that transmits the data channel for the UE. The multi-node high-layer signaling includes the node identifier corresponding to each coordinating node, the number of pilot ports and the pilot location that corresponds to each coordinating node, and/or the data-channel starting location corresponding to each coordinating node. Specifically, the UE determines the node that transmits the data channel for the UE according to the node list indicator information, and then searches, according to the multi-node high-layer signaling, for the node identifier, and/or the number of pilot ports and the pilot location, and/or the data-channel starting location that correspond to the node that transmits the data channel for the UE.

After the UE receives the scheduling result notification message, in step 104, the UE receives, according to the scheduling result notification message, the data transmitted by the base station that corresponds to the coordinating node serving the UE.

In this embodiment of the present invention, preferably, a node identifier of the master node serving the UE is used to perform scrambling code initialization and demodulation pilot initialization for the data transmitted by the base station that corresponds to the coordinating node serving the UE, and then the UE may perform descrambling and demodulation according to the node identifier of the master node. Certainly, a node identifier of a node that transmits the data channel for the UE after the scheduling may also be used to perform scrambling code initialization and demodulation pilot initialization for the data transmitted by the base station that corresponds to the coordinating node serving the UE. In this case, the UE may perform descrambling and demodulation according to the node identifier of the node that transmits the data channel for the UE. In addition, a predefined node identifier may also be used to perform scrambling code initialization and demodulation pilot initialization for the data transmitted by the base station that corresponds to the coordinating node serving the UE, and then the UE performs descrambling and demodulation according to the predefined node identifier. Certainly, which node identifier is specifically used to perform scrambling code initialization and demodulation pilot initialization may be predefined or notified by the base station.

If multiple coordinating nodes send the data channel PDSCH for the UE and send different data, the UE needs to perform synchronization with the coordinating nodes that send the PDSCH and receive the PDSCH. Specifically, the UE may perform, according to the scheduling result notification information and a timing offset that is sent by the base station, synchronization with the nodes that transmit the data channel for the UE, and receive the data transmitted by the nodes that transmit the data channel for the UE. For example, the UE performs downlink synchronization according to a synchronization channel of a reference coordinating node, the base station notifies the UE of a timing offset that corresponds to each non-reference coordinating node, and the UE performs synchronization with a non-reference coordinating node according to the belonging timing offset and the downlink synchronization with the reference coordinating node. The timing offset is determined according to an offset between the synchronization with the non-reference coordinating node and the synchronization with the reference coordinating node and according to an offset between the time when a UE uplink signal arrives at the non-reference coordinating node and the time when the UE uplink signal arrives at the reference coordinating node, where the reference coordinating node may be the master node or another coordinating node, and if it is the another coordinating node, the master-node base station may specify a reference coordinating node and notify the UE of the reference coordinating node, or the UE may select a reference coordinating node and feed it back to the master-node base station.

Specifically, the UE may also perform downlink synchronization according to the scheduling result notification information and synchronization information that is obtained from a synchronization channel of each node that transmits the data channel for the UE, and receive the data transmitted by the node that transmits the data channel for the UE.

It should be noted that when the coordinating node is a base station, a remote radio head, or a remote radio unit, the node identifier in this embodiment of the present invention is an identifier of the node or an identifier of a cell to which the node belongs; and when the coordinating node is a cell set or a node set, the node identifier in this embodiment of the present invention is an identifier of the node cell or an identifier of the cell set to which the node belongs.

Figure 4:
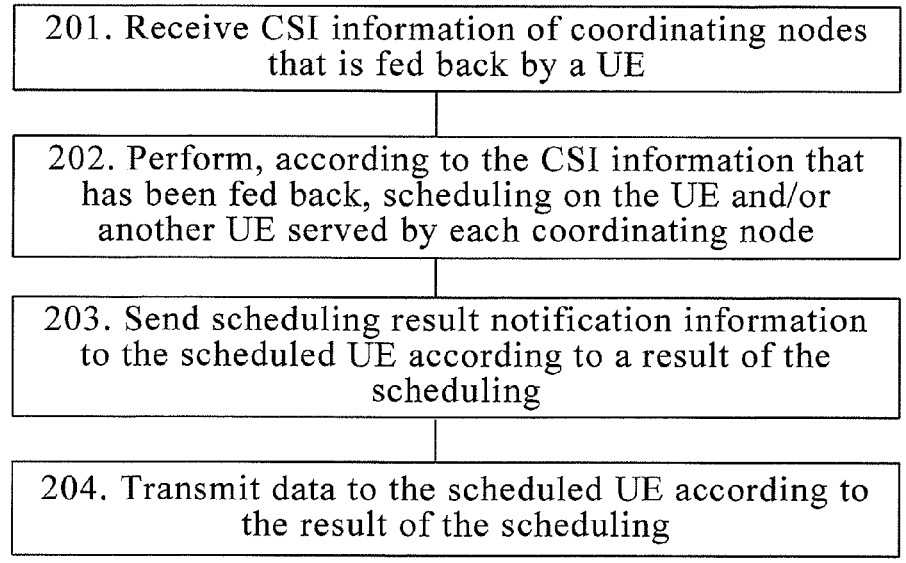
FIG. 4 is a flowchart of a method for coordinated multi-node transmission according to an embodiment of the present invention.

Corresponding to the foregoing method based on the UE, an embodiment of the present invention further provides a method for coordinated multi-node transmission. Based on a coordinating node of a UE, as shown in FIG. 4, the method includes:

201. Receive CSI information of coordinating nodes that is fed back by the UE.

Optionally, the CSI information includes various types of channel state information, for example, channel quality indicator CQI (Channel Quality Indicator) information, a signal-to-noise ratio, a channel feature vector, a channel capacity, or channel throughput.

The CSI information fed back by the UE may be CSI information of all coordinating nodes that is acquired by the UE or CSI information of a part of the coordinating nodes that is acquired by the UE.

Preferably, interference compensation is performed on the CSI information fed back by the UE, and therefore, it can indicate a channel state much closer to reality, thereby effectively improving accuracy of the CSI information.

In this case, further, in an embodiment of the present invention, before step 201, the method for coordinated multi-node transmission further includes:

sending measurement indicator information to the UE, where the measurement indicator information is used to indicate whether the UE performs interference compensation on the measured channel state.

In addition, the UE may perform interference compensation on all measured channel states and may also perform interference compensation on only a part of the measured channel states, where the part of the channel states on which the interference compensation is performed may also be notified by the base station; that is, further, in an embodiment of the present invention, before step 201, the method for coordinated multi-node transmission further includes:

sending interference compensation resource information to the UE, where the interference compensation resource information is used to indicate interfering-node indicator information or a location of a resource for the UE to perform interference compensation.

202. Perform, according to the CSI information that has been fed back, scheduling on the UE and/or one or more other UEs served by each coordinating node.

In this step, each coordinating node of the UE is capable of performing scheduling according to a predefined scheduling goal, so as to flexibly increase or decrease throughput of each coordinating node.

203. Send scheduling result notification information to the scheduled UE according to a result of the scheduling.

204. Transmit data to the scheduled UE according to the result of the scheduling.

According to the method for coordinated multi-node transmission provided in this embodiment of the present invention, a manner in which multiple nodes provide a service in a coordinated manner is used; a UE feeds back CSI information, and each coordinating node performs scheduling on the UE and/or one or more other UEs served by each coordinating node; in one aspect, the UE can feed back CSI information required for achieving a scheduling goal, so that a base station implements scheduling to achieve the scheduling goal; in another aspect, multi-node coordination is used to provide the service for the UE, and for the UE, a different coordinating node may transmit data for the UE at a certain period; therefore, each coordinating node is capable of performing scheduling according to a requirement of an expected scheduling goal and selectively serving UEs in a system. In this way, a flexible adjustment is performed on a communications system and the objective of flexible optimization of radio communications performance is achieved.

Further, in an exemplary embodiment of the present invention, before the receiving CSI information fed back by the UE in step 201, the method for coordinated multi-node transmission further includes:

sending CQI-biases selected for the UE to the UE, where, optionally, the CQI-biases are independently sent or jointly sent through cell-specific high-layer signaling, UE-specific high-layer signaling, or physical-layer dynamic signaling. It should be noted that the CQI-biases sent to the UE in this step include CQI-biases initially selected for the UE or CQI-biases re-selected for the UE, for example, adjusted CQI-biases.

The CQI-biases are mapped to a part of nodes or all of nodes among all coordinating nodes. When the CQI-biases are mapped to a part of all the coordinating nodes, for a coordinating node that does not have a corresponding CQI-bias, the UE determines 0 or a predefined value as its CQI-bias.

In this way, the UE can select, according to the CQI-biases selected for it and from all the acquired CSI information, CSI information that needs to be fed back. In this case, in step 201, the CSI selected by the UE according to the CQI-biases and from the CSI information of each coordinating node is received, where the CSI information of each coordinating node is acquired by the UE.

As to a CQI-bias, it is a selection reference parameter; for details about the selection reference parameter, refer to the detailed description in the UE-based method embodiment described above, and no further details are provided herein.

It should be noted that in this embodiment of the present invention, the base station sends feedback indicator information to the UE or predefined feedback indicator information is acquired, where the feedback indicator information is used to indicate the number of coordinating nodes for which the UE needs to feed back CSI information or indicate a feedback threshold; and the UE performs feedback according to the feedback indicator information. For details, refer to the detailed description in the UE-based method embodiment, and no further details are provided herein.

It should be noted that in this embodiment of the present invention, the CSI information fed back by the UE is firstly received by a master-node base station of the UE, and the master-node base station is capable of forwarding the CSI information fed back by the UE or information selected from the CSI information fed back by the UE to a corresponding coordinating cell or network-side device.

CQI-biases are introduced into the process where the UE feeds back CSI information, so that, in one aspect, the UE can feed back only a part of information in the CSI information of each coordinating node, thereby effectively reducing resource occupancy; in another aspect, the CQI-biases may allow the master-node base station of the UE to flexibly control the UE to feed back CSI information of specified coordinating nodes, and then allow each coordinating node to perform scheduling by using a coordinating node for which the UE performs feedback as a scheduling node. In other words, the master-node base station of the UE can purposefully control, according to a scheduling goal such as a requirement for optimizing throughput and by using the CQI-biases, the coordinating node for which the UE performs feedback, so that the coordinating node for which the UE performs feedback has a higher probability to serve UEs of all coordinating nodes, thereby achieving the scheduling goal and achieving the objective of flexible optimization of radio communications performance.

Specifically, as to the scheduling in step 202, this embodiment of the present invention provides two scheduling manners, which are distributed scheduling and joint scheduling. As to the distributed scheduling, as the name indicates, it means that each coordinating node performs scheduling independently, and the joint scheduling means that all coordinating nodes perform scheduling uniformly. The following describes in detail the distributed scheduling and the joint scheduling.

If the distributed scheduling manner is used, step 202 may specifically include:

performing, according to CSI information of a local coordinating node in the CSI information that has been fed back, scheduling on the UE and/or one or more other UEs served by the local node; and forwarding CSI information of one or more other coordinating nodes to a base station that corresponds to the one or more other coordinating nodes, where the CSI information of the one or more other coordinating nodes is in the CSI information that has been fed back, so that the base station that corresponds to the one or more other coordinating nodes performs, according to the CSI information that corresponds to the one or more other coordinating nodes, scheduling on a UE served by the one or more other coordinating nodes.

In an embodiment of the present invention, in a situation where the UE selects, by using the CQI-biases, the CSI information to be fed back, and after each coordinating node performs scheduling in step 202, the method further includes:

sending scheduling-related information to the one or more other coordinating nodes;

receiving scheduling-related information of the one or more other coordinating nodes;

determining, according to the scheduling-related information of the one or more other coordinating nodes and scheduling-related information of the local coordinating node, whether a scheduling stop condition is satisfied; and if the scheduling stop condition is not satisfied, adjusting the CQI-biases selected for the UE;

or further, when the scheduling stop condition is satisfied, adjusting the CQI-biases selected for the UE, for use in next scheduling; and sending the adjusted CQI-biases to the UE.

The scheduling-related information includes one or more of the following information: scheduling result information, information of a node-served user, and channel state information of the node-served user, for example, how many users provide feedback on a CSI information request service of the local node, the total number of resource blocks of CSI fed back by a user, or a channel state, such as a channel quality level, that corresponds to the CSI fed back by the user.

In this way, after step 202, the master-node base station of the UE can perform analysis on the result of the scheduling, so as to determine whether the result of the scheduling satisfies a predefined scheduling goal; and if it is not satisfied, may adjust, according to the predefined scheduling goal, CQI-biases selected by the UE for feedback, for example, increase or decrease the CQI-biases, and for a specific example, adjust the original CQI-biases by a certain step each time, or multiply the original CQI-biases by a certain factor each time, and send the adjusted CQI-biases to the UE. In this way, the base station purposefully controls, by using the adjusted CQI-biases, the coordinating node for which the UE performs the feedback, so that the coordinating node for which the UE performs the feedback has a higher probability to serve UEs of all coordinating nodes, thereby achieving the predefined scheduling goal and achieving the objective of flexible optimization of radio communications performance.

In the CSI information fed back by the UE, no matter whether the UE uses CQI-biases for selection, for a same time/frequency resource, the UE may feed back CSI of multiple nodes, and therefore, in an exemplary embodiment of the present invention, no matter whether CQI-biases are introduced into the process where the UE feeds back CSI information, the master-node base station of the UE may also select, by using the CQI-biases, CSI information that corresponds to the local coordinating node and the one or more other coordinating nodes from the channel state information that has been fed back, and forward the selected CSI information of the one or more other coordinating nodes to a corresponding coordinating node. Specifically, the master-node base station may select, for each UE and on each resource block, one node as a scheduling node by using the CQI-biases, and transmit CSI of the node that has been fed back to a corresponding node. In this way, a master coordinating node of the UE is capable of purposefully selecting a scheduling node for scheduling, so that the scheduling node has a higher probability to serve UEs of all coordinating nodes, thereby achieving the predefined scheduling goal and achieving the objective of flexible optimization of radio communications performance.

It should be noted that the CQI-biases used here has a same meaning as the CQI-biases in the UE-side embodiment, and the manner in which the master-node base station uses the CQI-biases for CSI information selection may also be the same as that in the foregoing UE-side embodiment, and specifically, in this case, step 202 specifically includes:

selecting, according to the CQI-biases selected for the UE and from the CSI information of the coordinating nodes that has been fed back, CSI information used by the local coordinating node for scheduling and CSI information used by the one or more other coordinating nodes for scheduling;

performing, according to the selected CSI information used by the local coordinating node for scheduling, scheduling on the UE and/or one or more other UEs served by the local node; and forwarding the selected CSI information used by the one or more other coordinating nodes for scheduling to a base station that corresponds to the one or more other coordinating nodes, so that the base station that corresponds to the one or more other coordinating nodes performs, according to the CSI information that corresponds to the one or more other coordinating nodes, scheduling on the UE served by the one or more other coordinating nodes.

Specifically, in an embodiment of the present invention, the CSI information that has been fed back includes channel state information; and the selecting, according to the CQI-biases and from the CSI information of the coordinating nodes that has been fed back, the CSI information corresponding to the local coordinating node and the CSI information corresponding to the one or more other coordinating nodes includes:

acquiring, for each coordinating node, the sum of channel state information of a corresponding coordinating node and a CQI-bias of the corresponding coordinating node;

sequencing the sums of channel state information and CQI-biases of all coordinating nodes; and selecting, according to a result of the sequencing, the CSI information used by the local coordinating node for scheduling and the CSI information used by the one or more other coordinating nodes for scheduling.

Preferably, the sum of channel state information and a CQI-bias of a selected coordinating node is greater than the sum of channel state information and a CQI-bias of an unselected coordinating node; that is, CSI information of one or more coordinating nodes the sum of whose channel state information and CQI-bias is the maximum is selected. Certainly, the present invention is not limited thereto, the sum of channel state information and a selection CQI-bias of a selected coordinating node is not limited to one or more of those that have the maximum value, and the selection may also be performed in another manner, for example, selecting CSI information of one or more coordinating nodes the sum of whose channel state information and selection CQI-bias is sequenced in a middle location.

Figure 5:
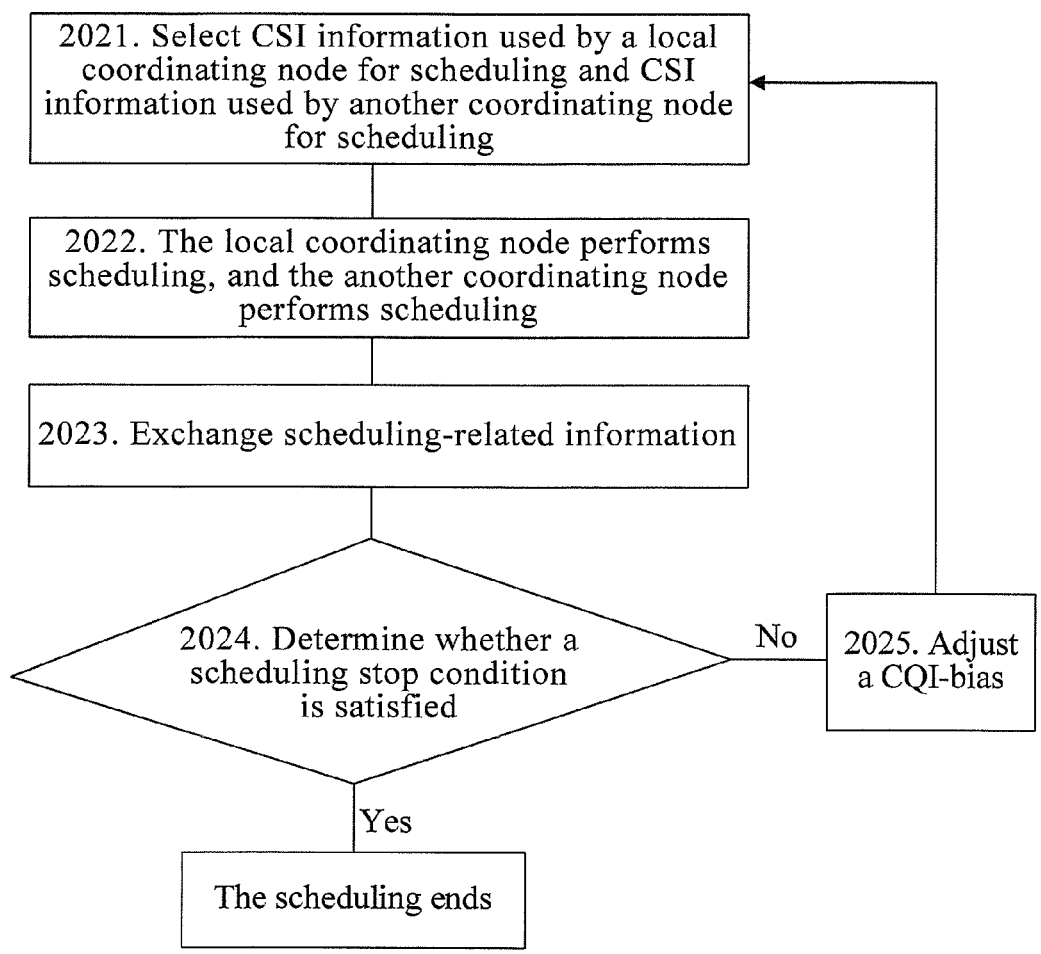
FIG. 5 is a flowchart of a method for coordinated multi-node transmission according to an embodiment of the present invention.

Further, in an embodiment of the present invention, as shown in FIG. 5, step 202 specifically includes:

2021. Select, according to the CQI-biases selected for the UE and from the CSI information of the coordinating nodes that has been fed back, CSI information used by the local coordinating node for scheduling and CSI information used by the one or more other coordinating nodes for scheduling.

2022. Perform, according to the selected CSI information used by the local coordinating node for scheduling, scheduling on the UE and/or the one or more other UEs served by the local node; and forward the selected CSI information used by the one or more other coordinating nodes for scheduling to a base station that corresponds to the one or more other coordinating nodes, so that the base station that corresponds to the one or more other coordinating nodes performs, according to the CSI information that corresponds to the one or more other coordinating nodes, scheduling on the UE served by the one or more other coordinating nodes.

2024. Send scheduling-related information of the local coordinating node to the one or more other coordinating nodes, and receive scheduling-related information of the one or more other coordinating nodes, where the scheduling-related information of the one or more other coordinating nodes corresponds to the selected CSI information.

The scheduling-related information includes one or more of the following information:

scheduling result information, information of a node-served user, and channel state information of the node-served user.

2025. Determine, according to the scheduling-related information of the one or more other coordinating nodes and scheduling-related information of the local coordinating node, whether a scheduling stop condition is satisfied.

2026. If the scheduling stop condition is not satisfied, adjust the CQI-biases.

Specifically, the original CQI-biases are increased or decreased.

Optionally, the adjusted CQI-biases are used in a next scheduling process.

Figure 6:
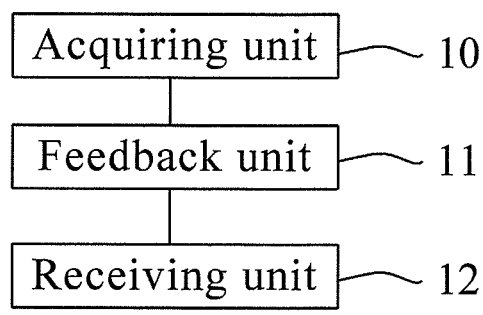
FIG. 6 is a structural block diagram of a UE according to an embodiment of the present invention.

Certainly, further, in an embodiment of the present invention, an iterative scheduling manner may be used in step 202. In this case, the CQI-biases adjusted in step 2026 are used for next iterative re-scheduling during this scheduling, this scheduling ends after the scheduling stop condition is satisfied, and steps 203 and 204 are further performed. Specifically, as shown in FIG. 6, after step 2026, if the scheduling stop condition is not satisfied, the process returns to step 2021 and the process of CSI information selection and the process of scheduling are performed again, that is, step 202 further includes:

selecting, according to the adjusted CQI-biases and from the CSI information that has been fed back, CSI information used by the local coordinating node for scheduling and CSI information used by the one or more other coordinating nodes for scheduling;

performing, according to the selected CSI information used by the local coordinating node for scheduling, re-scheduling on the UE and/or one or more other UEs served by the local node; and forwarding the selected CSI information used by the one or more other coordinating nodes for scheduling to a base station that corresponds to the one or more other coordinating nodes, so that the base station that corresponds to the one or more other coordinating nodes performs, according to the CSI information that corresponds to the one or more other coordinating nodes, re-scheduling on the UE served by the one or more other coordinating nodes.

The scheduling stop condition is one of the following: a re-scheduling times threshold is reached, a difference or a ratio between scheduling goals during two consecutive times of scheduling reaches a specified range, and a scheduling goal is achieved. If at least two scheduling stop conditions are set, preferably, the iterative re-scheduling process is stopped as long as one of the two scheduling stop conditions is satisfied.

For example, the scheduling stop condition includes that the re-scheduling times threshold of 3 and a predefined scheduling goal are achieved, and in the process of each time of scheduling during iterative scheduling, in step 2025, whether the predefined scheduling goal is achieved may be firstly determined; if it is achieved, the entire scheduling process ends; and if it is not achieved, whether re-scheduling has been performed for three times is further be determined; if yes, the entire scheduling process ends; and if not, iterative re-scheduling is continued.

The following describes an adjustment on a CQI-bias in detail by using an example. The adjustment on the CQI-bias may be used for an adjustment on a CQI-bias that is used by the UE in the foregoing embodiment, and may also be used for an adjustment on a CQI-bias that is used by a coordinating node to select CSI information in the foregoing embodiment. The following examples are described by using a first node and a second node as an example. It should be noted that the first node may be one or more coordinating nodes, and the second node may be one or more coordinating nodes, and specific examples are as follows:

In an embodiment of the present invention:

the scheduling-related information transmitted between coordinating nodes is information of a node-served user, where the information of the node-served user includes the average number of users that need to be served by a coordinating node;

the scheduling goal is that a ratio of the average number of users that need to be served by the first node to the average number of users that need to be served by the second node is less than a first specified threshold and/or greater than a second specified threshold; and the adjusting the CQI-bias includes:

if the ratio of the average number of users that need to be served by the first node to the average number of users that need to be served by the second node is greater than the first specified threshold, decreasing a CQI-bias of the first node and/or increasing a CQI-bias of the second node; and if the ratio of the average number of users that need to be served by the first node to the average number of users that need to be served by the second node is less than the second specified threshold, increasing the CQI-bias of the first node and/or decreasing the CQI-bias of the second node.

In an embodiment of the present invention:

the scheduling-related information transmitted between coordinating nodes is information of a node-served user, where the information of the node-served user includes the total number of users that need to be served by a node;

the scheduling goal is that a ratio of the total number of users that need to be served by the first node to the total number of users that need to be served by the second node is less than a first specified threshold and/or greater than a second specified threshold; and the adjusting the CQI-bias includes:

if the ratio of the total number of users that need to be served by the first node to the total number of users that need to be served by the second node is greater than the first specified threshold, decreasing a CQI-bias of the first node and/or increasing a CQI-bias of the second node; and if the ratio of the total number of users that need to be served by the first node to the total number of users that need to be served by the second node is less than the second specified threshold, increasing the CQI-bias of the first node and/or decreasing the CQI-bias of the second node.

In an embodiment of the present invention:

the scheduling-related information transmitted between coordinating nodes is information of a node-served user, where the information of the node-served user includes node-edge user throughput or average node throughput;

the scheduling goal is that a ratio of node-edge user throughput or average node throughput of the first node to node-edge user throughput or average node throughput of the second node is less than a first specified threshold and/or greater than a second specified threshold; and the adjusting the CQI-bias includes:

if the ratio of node-edge user throughput or average node throughput of the first node to node-edge user throughput or average node throughput of the second node is greater than the first specified threshold, increasing a CQI-bias of the first node and/or decreasing a CQI-bias of the second node; and if the ratio of node-edge user throughput or average node throughput of the first node to node-edge user throughput or average node throughput of the second node is less than the second specified threshold, decreasing the CQI-bias of the first node and/or increasing the CQI-bias of the second node.

In an embodiment of the present invention:

the scheduling-related information transmitted between coordinating nodes is information of a node-served user, where the information of the node-served user includes node-edge user throughput, average node throughput, or an average priority of node-served users;

the scheduling goal is that the sum of node-edge user throughput, average node throughput, or average priorities of node-served users of multiple coordinating nodes is greater than a specified threshold or reaches an upper limit; and the adjusting the CQI-bias includes:

if, after a CQI-bias of one or more coordinating nodes thereof is decreased or increased, the sum of node-edge user throughput, average node throughput, or average priorities of node-served users of the multiple coordinating nodes is increased, decreasing or increasing the CQI-bias of the one or more coordinating nodes; and if, after the CQI-bias of the one or more coordinating nodes thereof is decreased or increased, the sum of node-edge user throughput, average node throughput, or average priorities of node-served users of the multiple coordinating nodes is decreased or unchanged, increasing, decreasing, or not changing the CQI-bias of the one or more coordinating nodes.

In an embodiment of the present invention:

the scheduling-related information transmitted between coordinating nodes is state information of channels from the UE to the nodes;

the scheduling goal is that throughput of the UE is greater than a certain specified threshold; and the adjusting the CQI-bias includes:

if the first node is capable of providing larger throughput for the UE relative to the second node, and the throughput of the UE is less than the certain specified threshold, increasing a CQI-bias of the UE relative to the first node and/or decreasing a CQI-bias of the UE relative to the second node; and if the second node is capable of providing larger throughput for the UE relative to the first node, and the throughput of the UE is less than the certain specified threshold, increasing a CQI-bias of the UE relative to the second node and/or decreasing a CQI-bias of the UE relative to the first node.

In an embodiment of the present invention:

the scheduling-related information transmitted between coordinating nodes is state information of channels from the UE to the nodes;

the scheduling goal is that throughput of the UE is less than a certain specified threshold; and the adjusting the CQI-bias includes:

if the first node is capable of providing larger throughput for the UE relative to the second node, and the throughput of the UE is greater than the certain specified threshold, decreasing a CQI-bias of the UE relative to the first node and/or increasing a CQI-bias of the UE relative to the second node; and if the second node is capable of providing larger throughput for the UE relative to the first node, and the throughput of the UE is greater than the certain specified threshold, decreasing a CQI-bias of the UE relative to the second node and/or increasing a CQI-bias of the UE relative to the first node.

It should be noted that when the first node and the second node are all multiple coordinating nodes, in the foregoing examples, all coordinating nodes of the first node and all coordinating nodes of the second node need to meet a comparison relationship.

It should be noted that the foregoing examples are used only for describing the adjustment on the CQI-bias in this embodiment of the present invention and are not intended to set any limitation to the present invention.

It should be noted that the channel state indicator information used by the local coordinating node for scheduling and the channel state indicator information used by the one or more other coordinating nodes for scheduling may be selected according to channel state indicator information and a CQI-bias that are fed back by a user, according to the channel state indicator information, which is adjusted according to the result of the scheduling, of the user, or according to the channel state indicator information and the CQI-bias of the user that are adjusted according to the result of the scheduling.

The throughput and the priority are obtained according to the channel state indicator information fed back by the user or obtained according to the channel state indicator information, which is adjusted according to the result of the scheduling, of the user.

It should be noted that in an exemplary embodiment of the present invention, for the base station, a CQI-bias may be the sum of two parts:

CQI-bias=Node-specific CQI-bias+User-specific CQI-bias

When the master-node base station adjusts CQI-biases of users within an entire node, it actually adjusts node-specific CQI-biases. For example, when the average number of resources of users of node A/the average number of resources of users of node B>a predefined threshold, a CQI-bias of a user within the entire node may be adjusted, for example, a node-specific CQI-bias of the user relative to node A is decreased.

When a channel capacity of a certain user on node A/a channel capacity of the user on node B>a predefined threshold, a user-specific CQI-bias of the user may be adjusted, for example, a user-specific CQI-bias of the user relative to node A is increased.

From the above, when a CQI-bias is adjusted, a node-specific CQI-bias or a user-specific CQI-bias is adjusted, so that when the CQI-bias is used, the total CQI-bias is used.

Using the joint scheduling is equivalent to arranging an independent scheduler on a network side, where the scheduler may be arranged on a base station of any coordinating node or exist independently of a base station of each coordinating node, and the scheduler collects all CSI information fed back by a UE of each coordinating node and performs uniform scheduling. In this case, step 202 may specifically include:

calculating, according to the CSI information fed back by the UE and CSI information fed back by one or more other UEs served by each coordinating node, a scheduling priority of each UE in each dimension including a time domain, a frequency domain, a node domain, a frequency domain and a node domain, or a time domain and a node domain; and according to the scheduling priority of each UE in each dimension including the time domain, the frequency domain, the node domain, the frequency domain and the node domain, or the time domain and the node domain, allocating a node and a time/frequency resource to each UE to serve the UE, or selecting, for each time/frequency resource of each coordinating node, a UE or a UE group that needs to be served.

For example, the scheduler calculates a scheduling priority of each UE on each time/frequency resource block with respect to each node and performs scheduling resource selection among all the scheduling priorities in the multiple dimensions including the time domain, the frequency domain, the user domain, the node domain, and the like. For example, the maximum among all the priorities may be selected to allocate a time/frequency resource of a corresponding node to a corresponding user; if a transmission mode in which multiple users concurrently use a same resource is used, a user to be served may continue to be selected on the resource block; otherwise, scheduling on the resource block of the node is already completed, and all priorities that correspond to the resource block of the node and are among the scheduling priorities do not participate in resource allocation any longer; subsequently, the maximum scheduling priority continues to be selected among scheduling priorities that can participate in scheduling selection to allocate a resource till the scheduling is completed.

Certainly, iterative scheduling may also be used in the joint scheduling. Specifically, in the iterative scheduling manner, step 202 specifically includes:

calculating, according to the CSI information fed back by the UE and CSI information fed back by one or more other UEs served by each coordinating node, a scheduling priority of each UE in each dimension including a time domain, a frequency domain, a node domain, a frequency domain and a node domain, or a time domain and a node domain;

according to the scheduling priority of each UE in each dimension including the time domain, the frequency domain, the node domain, the frequency domain and the node domain, or the time domain and the node domain, allocating a node and a time/frequency resource to each UE to serve the UE, or selecting, for each time/frequency resource of each coordinating node, a UE or a UE group that needs to be served;

determining, according to the serving node and the time/frequency resource that are allocated to each UE or according to the UE or the UE group that needs to be served and is selected for each time/frequency resource of each coordinating node, whether the scheduling stop condition is satisfied; and if the scheduling stop condition is not satisfied, adjusting a proportional fairness factor, or further, when the scheduling stop condition is satisfied, adjusting a proportional fairness factor for use in next scheduling.

The proportional fairness factor is a variable related to a scheduling priority, for example, it is in direct proportion to the scheduling priority, and when the proportional fairness factor changes, the scheduling priority changes correspondingly.

After the proportional fairness factor is adjusted, an iterative re-scheduling process is entered according to the adjusted proportional fairness factor; that is, the method includes:

adjusting, according to the adjusted proportional fairness factor, the scheduling priority of each UE in each dimension including the time domain, the frequency domain, the node domain, the frequency domain and the node domain, or the time domain and the node domain; and according to the adjusted scheduling priority of each UE in each dimension including the time domain, the frequency domain, the node domain, the frequency domain and the node domain, or the time domain and the node domain, re-allocating a node and a time/frequency resource to each UE to serve the UE, or re-selecting, for each time/frequency resource of each coordinating node, a UE or a UE group that needs to be served.

The following describes the adjustment on the proportional fairness factor in detail by using examples. The following examples are described by also using a first node and a second node as an example. It should be noted that the first node may be one or more coordinating nodes, and the second node may be one or more coordinating nodes, and specific examples are as follows:

In an embodiment of the present invention:

the scheduling goal is that a ratio of the average number of users that need to be served by a first coordinating node to the average number of users that need to be served by a second coordinating node is less than a first specified threshold and/or greater than a second specified threshold; and the adjusting the proportional fairness factor includes:

if the ratio of the average number of users that need to be served by the first node to the average number of users that need to be served by the second coordinating node is greater than the first specified threshold, decreasing a proportional fairness factor of the first coordinating node and/or increasing a proportional fairness factor of the second coordinating node; and if the ratio of the average number of users that need to be served by the first node to the average number of users that need to be served by the second coordinating node is less than the second specified threshold, increasing the proportional fairness factor of the first coordinating node and/or decreasing the proportional fairness factor of the second coordinating node.

In an embodiment of the present invention:

the scheduling goal is that a ratio of the total number of users that need to be served by the first coordinating node to the total number of users that need to be served by the second coordinating node is less than a first specified threshold and/or greater than a second specified threshold; and the adjusting the proportional fairness factor includes:

if the ratio of the total number of users that need to be served by the first coordinating node to the total number of users that need to be served by the second coordinating node is greater than the first specified threshold, decreasing a proportional fairness factor of the first coordinating node and/or increasing a proportional fairness factor of the second coordinating node; and if the ratio of the total number of users that need to be served by the first coordinating node to the total number of users that need to be served by the second coordinating node is less than the second specified threshold, increasing the proportional fairness factor of the first coordinating node and/or decreasing the proportional fairness factor of the second coordinating node.

In an embodiment of the present invention:

the scheduling goal is that a ratio of node-edge user throughput, average node throughput, or an average priority of node-served users of the first coordinating node to node-edge user throughput, average node throughput, or an average priority of node-served users of the second coordinating node is less than a first specified threshold and/or greater than a second specified threshold; and the adjusting the proportional fairness factor includes:

if the ratio of node-edge user throughput or average node throughput of the first node to node-edge user throughput or average node throughput of the second coordinating node is greater than the first specified threshold, increasing a proportional fairness factor of the first coordinating node and/or decreasing a proportional fairness factor of the second coordinating node; and if the ratio of node-edge user throughput or average node throughput of the first node to node-edge user throughput or average node throughput of the second coordinating node is less than the second specified threshold, decreasing the proportional fairness factor of the first coordinating node and/or increasing the proportional fairness factor of the second coordinating node.

In an embodiment of the present invention:

the scheduling goal is that a ratio of an average priority of node-served users of the first coordinating node to an average priority of node-served users of the second coordinating node is less than a first specified threshold and/or greater than a second specified threshold; and the adjusting the proportional fairness factor includes:

if the ratio of the average priority of node-served users of the first node to the average priority of node-served users of the second coordinating node is greater than the first specified threshold, decreasing a proportional fairness factor of the first coordinating node and/or increasing a proportional fairness factor of the second coordinating node; and if the ratio of the average priority of node-served users of the first node to the average priority of node-served users of the second coordinating node is less than the second specified threshold, increasing the proportional fairness factor of the first coordinating node and/or decreasing the proportional fairness factor of the second coordinating node.

In an embodiment of the present invention:

the scheduling goal is that the sum of node-edge user throughput, average node throughput, or average priorities of node-served users of multiple coordinating nodes is greater than a specified threshold or reaches an upper limit; and the adjusting the proportional fairness factor includes:

if, after a proportional fairness factor of one or more coordinating nodes thereof is decreased or increased, the sum of node-edge user throughput, average node throughput, or average priorities of node-served users of the multiple coordinating nodes is increased, decreasing or increasing the proportional fairness factor of the one or more coordinating nodes; and if, after the proportional fairness factor of the one or more coordinating nodes thereof is decreased or increased, the sum of node-edge user throughput, average node throughput, or average priorities of node-served users of the multiple coordinating nodes is decreased or unchanged, increasing, decreasing, or not changing the proportional fairness factor of the one or more coordinating nodes.

In an embodiment of the present invention:

the scheduling goal is that throughput of the user is greater than a certain specified threshold; and the adjusting the proportional fairness factor includes:

increasing a proportional fairness factor of the user relative to all coordinating nodes; or if the first node is capable of providing larger throughput for the user relative to the second node, and the throughput of the user is less than the certain specified threshold, increasing a proportional fairness factor of the user relative to the first coordinating node and/or decreasing a proportional fairness factor of the user relative to the second coordinating node; and if the second node is capable of providing larger throughput for the user relative to the first node, and the throughput of the user is less than the certain specified threshold, increasing the proportional fairness factor of the user relative to the second coordinating node and/or decreasing the proportional fairness factor of the user relative to the first coordinating node.

In an embodiment of the present invention:

the scheduling goal is that throughput of the UE is less than a certain specified threshold; and the adjusting the proportional fairness factor includes:

decreasing a proportional fairness factor of the UE relative to all coordinating nodes; or if the first node is capable of providing larger throughput for the UE relative to the second node, and the throughput of the UE is greater than the certain specified threshold, decreasing a proportional fairness factor of the UE relative to the first coordinating node and/or increasing a proportional fairness factor of the UE relative to the second coordinating node; and if the second node is capable of providing larger throughput for the UE relative to the first node, and the throughput of the UE is greater than the certain specified threshold, decreasing the proportional fairness factor of the UE relative to the second coordinating node and/or increasing the proportional fairness factor of the UE relative to the first coordinating node.

It should be noted that when the first node and the second node are all multiple coordinating nodes, in the foregoing examples, all coordinating nodes of the first node and all coordinating nodes of the second node need to meet a comparison relationship.

It should be noted that the channel state indicator information used by the local coordinating node for scheduling and the channel state indicator information used by the one or more other coordinating nodes for scheduling may be selected according to the channel state indicator information fed back by the user or according to the channel state indicator information, which is adjusted according to the result of the scheduling, of the user.

The throughput and the priority are obtained according to the channel state indicator information fed back by the user or obtained according to the channel state indicator information, which is adjusted according to the result of the scheduling, of the user.

It should be noted that the foregoing examples are used only for describing the adjustment on the proportional fairness factor in this embodiment of the present invention and are not intended to set any limitation to the present invention.

After step 202 ends, the master-node base station of the UE sends a scheduling result notification message to the UE according to the result of the scheduling. According to the result of the scheduling, one or more coordinating nodes may concurrently send a data information physical downlink shared channel PDSCH (Physical Downlink Shared Channel) to the UE, and when multiple coordinating nodes concurrently transmit a same PDSCH or different PDSCHs to the UE, if used time/frequency resources cannot be completely overlapped, the base station may indicate transmission of a corresponding PDSCH by using multiple pieces of downlink control information DCI (Downlink Control Information), for example, indicate a resource block and HARQ information that are used by each node to transmit data for the UE, or indicating that an SCID corresponding to a demodulation reference signal DMRS (Demodulation Reference Signal) is used; and if the used time/frequency resources are completely overlapped, the base station may indicate related information of multiple code words by using DCI that carries multiple code word indicators. In addition, when multiple pieces of DCI are concurrently sent to the UE, the base station needs to notify the UE and requires the UE to detect and receive the multiple pieces of DCI.

That is, optionally, step 203 specifically includes:

sending the UE one or more pieces of downlink control information that indicate data channel transmission, where the multiple pieces of downlink control information indicate scheduling information for different nodes to transmit user data on a same carrier or different carriers, and a node that sends the downlink control information may be the same as or different from a node that transmits the user data;

or sending downlink control information that indicates data channel transmission to the UE, where the downlink control information includes one or more code word indicators, multiple code words included in the downlink control information are used to indicate code word information for different nodes to transmit user data on a same carrier or different carriers, and a node that sends the downlink control information may be the same as or different from a node that transmits the user data.

In addition, one or more coordinating nodes may concurrently send a data information physical downlink shared channel PDSCH to the UE according to the result of the scheduling. Optionally, the base station needs to notify the UE of a node that transmits the data channel, namely, the PDSCH, for the UE, and/or demodulation pilot information of the data channel. In an embodiment of the present invention, step 203 specifically includes:

sending node list indicator information and/or extension identifier information to the UE, where the node list indicator information is used to indicate a node that transmits a data channel for the UE, and the extension identifier information is used to indicate demodulation pilot information of the data channel.

Specifically, in this embodiment of the present invention, to send the node list indicator information and/or the extension identifier information, signaling, namely, a transmission indicator, used to bear the node list information and/or the extension identifier information may be added, and a base station of the master coordinating node sends the node list indicator information and/or the extension identifier information through the transmission indicator; in this case, the UE receives the node list indicator information and/or the extension identifier information that is sent by the base station through the transmission indicator. For example, dynamic signaling M1 may be added and used to send the node list indicator information, or dynamic signaling M2 may be added and used to send the node list indicator information and the extension identifier information. When the base station sends the node list indicator information and/or the extension identifier information through the transmission indicator, optionally, the base station sends high-layer signaling to the UE, where the high-layer signaling indicates that the node list indicator information and/or the extension identifier information is sent through the carrier indicator or the transmission indicator. In addition, optionally, when the base station sends the node list indicator information and/or the extension identifier information through the transmission indicator, the base station needs to notify the UE whether the transmission indicator is sent, that is, the method in this embodiment of the present invention further includes:

sending high-layer signaling to the UE, where the high-layer signaling indicates whether the transmission indicator is sent.

Certainly, the base station may also send the node list indicator information and/or the extension identifier information by multiplexing existing signaling, for example, a carrier indicator CIF (Carrier Indicator Field), and in this case, the UE receives the node list indicator information and/or the extension identifier information sent by the base station through the CIF. When the base station sends the node list indicator information and/or the extension identifier information through the CIF, the base station needs to notify the UE through high-layer signaling that the CIF is the node list indicator information and/or the extension identifier information, that is, the method in this embodiment of the present invention further includes:

sending high-layer signaling to the UE, where the high-layer signaling is used to indicate that the carrier indicator is the node list indicator information and/or the extension identifier information.

It should be noted that when the node list indicator information and/or the extension identifier information can be sent through both the transmission indicator and the CIF, the base station needs to tell the UE whether the transmission indicator or the CIF is used to send the node list indicator information and/or the extension identifier information, that is, the method in this embodiment of the present invention further includes:

sending high-layer signaling to the UE, where the high-layer signaling indicates that the node list indicator information and/or the extension identifier information is sent through the carrier indicator or the transmission indicator.

Optionally, a mapping between the carrier indicator or the transmission indicator and the node list indicator information and/or the extension identifier information is indicated through a bitmap mapping or a state mapping, or indicated through a bitmap mapping or a state mapping that is indicated in the high-layer signaling.

Further, in an embodiment of the present invention, the base station may also send carrier indicator information and the node list indicator information and/or the extension identifier information through a hybrid indicator; that is, the hybrid indicator includes the carrier indicator information and further includes the node list indicator information and/or the extension identifier information, and in this case, the method in this embodiment further includes:

sending the carrier indicator information and the node list indicator information and/or the extension identifier information to the UE through the hybrid indicator.

Optionally, the base station needs to indicate, through high-layer signaling, that the hybrid indicator is the carrier indicator information and the node list indicator information and/or the extension identifier information, that is, the method in this embodiment of the present invention further includes:

sending high-layer signaling to the UE, where the high-layer signaling indicates that the hybrid indicator is the carrier indicator information and the node list indicator information and/or the extension identifier information.

In addition, optionally, when the base station sends the carrier indicator information and the node list indicator information and/or the extension identifier information through the hybrid indicator, the base station needs to notify the UE whether the hybrid indicator is sent, that is, the method in this embodiment of the present invention further includes:

sending high-layer signaling to the UE, where the high-layer signaling indicates whether the hybrid indicator is sent.

Similarly, mappings between the hybrid indicator and the carrier indicator information and between the hybrid indicator and the node list indicator information and/or the extension identifier information may be indicated through a bitmap mapping or a state mapping, or indicated through a bitmap mapping or a state mapping that is indicated in the high-layer signaling.

Further, in an embodiment of the present invention, before the sending node list indicator information to the UE, the method further includes:

sending multi-node high-layer signaling to the UE, where the multi-node high-layer signaling includes at least one of the following information:

a node identifier corresponding to each coordinating node, the number of pilot ports corresponding to each coordinating node, a pilot location corresponding to each coordinating node, and a data-channel starting location corresponding to each coordinating node.

After the scheduling result notification message is sent, in step 204, a base station of a node that is scheduled to the UE to transmit a data channel for the UE transmits data to the scheduled UE; preferably, a node identifier of a master node serving the UE or a predefined node identifier is used to perform scrambling code initialization and demodulation pilot initialization for data transmitted by a base station that corresponds to a coordinating node serving the UE; and certainly, for the data transmitted by the base station that corresponds to the coordinating node serving the UE, a node identifier of the node that transmits the data channel for the UE after the scheduling may also be used to perform the scrambling code initialization and the demodulation pilot initialization.

In order for the UE to perform timing synchronization when receiving data, the method in this embodiment of the present invention may further include:

sending the UE a timing offset corresponding to each coordinating node that sends a data channel for the UE.

Optionally, in step 204, the node identifier of the master node serving the UE or an identifier of a node that transmits data for the UE or the predefined node identifier is used to perform the scrambling code initialization and the demodulation pilot initialization for the data transmitted to the UE.

In this case, further, in an embodiment of the present invention, the method further includes:

sending indicator signaling, where the indicator signaling is used to indicate whether the node identifier of the master node serving the UE, the identifier of the node that transmits the data for the UE, or the predefined node identifier is used to perform the scrambling code initialization and the demodulation pilot initialization for the data transmitted by the base station that corresponds to the coordinating node serving the UE.

It should be noted that in this embodiment of the present invention, the coordinating node is a cell, a base station, a remote radio head, a remote radio unit, a cell set, or a node set; when the coordinating node is a base station, a remote radio head, or a remote radio unit, the node identifier is an identifier of the node or an identifier of a cell to which the node belongs; and when the coordinating node is a cell set or a node set, the node identifier is an identifier of the node set or an identifier of the cell set to which the node belongs.

Corresponding to the foregoing method, an embodiment of the present invention further provides a UE. As shown in FIG. 6, the UE provided in this embodiment of the present invention includes:

an acquiring unit 10, configured to acquire CSI information of each coordinating node;

a feedback unit 11, configured to feed back all information or a part of information in the acquired CSI information to a base station, so that each coordinating node performs, according to the CSI information that has been fed back, scheduling on the UE and/or one or more other UEs served by each coordinating node; and a receiving unit 12, configured to: if the UE is scheduled, receive scheduling result notification information sent by the base station, and receive, according to the scheduling result notification information, data transmitted by a base station that corresponds to a coordinating node serving the UE.

According to the UE provided in this embodiment of the present invention, a manner in which multiple nodes provide a service in a coordinated manner is used; the UE feeds back CSI information, and each coordinating node performs scheduling on the UE and/or one or more other UEs served by each coordinating node; in one aspect, the UE can feed back CSI information required for achieving a scheduling goal, so that a base station implements scheduling to achieve the scheduling goal; in another aspect, multi-node coordination is used to provide the service for the UE, and for the UE, a different coordinating node may transmit data for the UE at a certain period; therefore, each coordinating node is capable of performing scheduling according to a requirement of an expected scheduling goal and selectively serving UEs in a system. In this way, a flexible adjustment is performed on a communications system and the objective of flexible optimization of radio communications performance is achieved.

Figure 7:
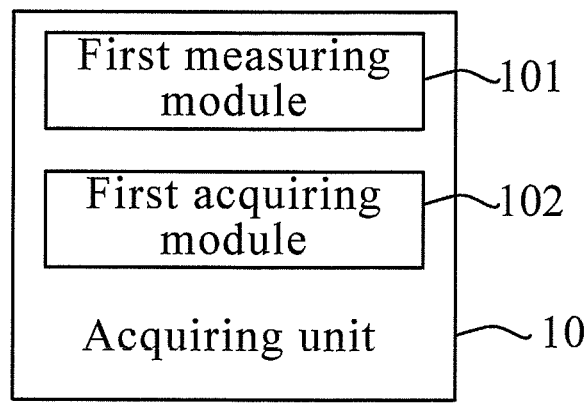
FIG. 7 is a structural block diagram of a UE according to an embodiment of the present invention.

Optionally, in an embodiment of the present invention, as shown in FIG. 7, the acquiring unit 10 includes:

a first measuring module 101, configured to measure a channel state of each coordinating node; and a first acquiring module 102, configured to acquire CSI information of each coordinating node according to the measured channel state.

Figure 8:
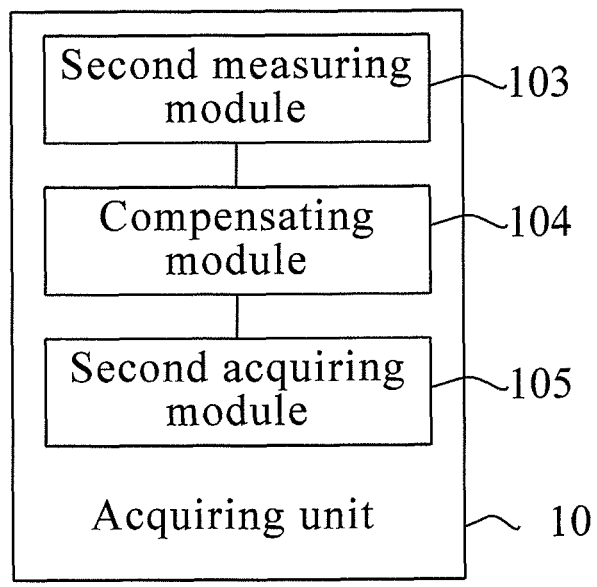
FIG. 8 is a structural block diagram of a UE according to an embodiment of the present invention.

Preferably, in another embodiment of the present invention, to effectively improve accuracy of the CSI information, as shown in FIG. 8, the acquiring unit 10 specifically includes:

a second measuring module 103, configured to measure a channel state of each coordinating node;

a compensating module 104, configured to perform interference compensation on the measured channel state; and a second acquiring module 105, configured to acquire CSI information of each coordinating node according to the channel state on which the interference compensation has been performed.

Performing interference compensation on the measured channel state can make the channel state after the interference compensation closer to an actual channel state, thereby effectively improving the accuracy of the CSI information.

Optionally, in an embodiment of the present invention:

the CSI information includes CQI information;

the second measuring module 103 is specifically configured to: measure interference on a first-category resource element, where the first-category resource element is a resource element at the same location as an interference reference signal of a coordinating cell to be measured, and the coordinating cell to be measured is a coordinating node whose channel state is to be measured; acquire a location of a second-category resource element, where the second-category resource element is a part or all of resource elements apart from the first-category resource element; and measure interference on the second-category resource element;

the compensating module 104 is specifically configured to obtain equivalent interference according to the interference on the first-category resource element and the interference on the second-category resource element; and the second acquiring module 105 is specifically configured to acquire, according to the equivalent interference, CQI information of the coordinating node to be measured.

Optionally, in an embodiment of the present invention:

the CSI information includes CQI information;

the second measuring module 103 is specifically configured to: measure a signal-to-noise ratio on a first-category resource element, where the first-category resource element is a resource element at the same location as an interference reference signal of a coordinating node to be measured, and the coordinating node to be measured is a coordinating node whose channel state is to be measured; acquire a location of a second-category resource element, where the second-category resource element is a part or all of resource elements apart from the first-category resource element; and measure a signal-to-noise ratio on the second-category resource element;

preferably, the second-category resource element is a resource element that suffers heavy interference from one or more other coordinating nodes or a resource element that suffers interference at an intensity an absolute value of a difference between which and an intensity of interference suffered by the first-category resource element is greater than a certain threshold;

the heavily-interfering coordinating node is at least one node that is among all coordinating nodes apart from the coordinating node to be measured and whose receive power value, for the UE, is greater than receive power values of the other coordinating nodes;

in this case, the compensating module 104 is specifically configured to: obtain an equivalent signal-to-noise ratio according to the signal-to-noise ratio on the first-category resource element and the signal-to-noise ratio on the second-category resource element; and in this case, the second acquiring module 105 is specifically configured to acquire CQI information of each coordinating node according to the equivalent signal-to-noise ratio.

Certainly, in another embodiment of the present invention, the second measuring module 103 may further be specifically configured to measure a signal-to-noise ratio on the first-category resource element; and in this case, the compensating module 104 is specifically configured to: perform an adjustment on the signal-to-noise ratio on the first-category resource element according to signal-to-noise ratio adjustment signaling received from the base station, so as to obtain an equivalent signal-to-noise ratio; and the second acquiring module 105 is specifically configured to acquire the CQI information of each coordinating node according to the equivalent signal-to-noise ratio.

Further, in an embodiment of the present invention, the receiving unit 12 is further configured to: before the CSI information of each coordinating node is acquired, receive measurement indicator information sent by the base station, where the measurement indicator information is used to indicate whether the UE performs interference compensation on the measured channel state.

Further, in another embodiment of the present invention, the receiving unit 12 is further configured to: before the UE acquire the CSI information of each coordinating node, receive interference compensation resource information sent by the base station, where the interference compensation resource information is used to indicate interfering-node indicator information or a location of a resource for the UE to perform interference compensation; and in this case, the compensating module 104 is specifically configured to perform interference compensation on the measured channel state of a coordinating node or of the resource indicated in the interference compensation resource information.

Figure 9:
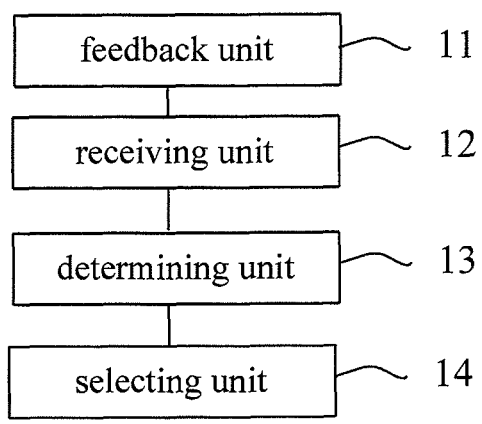
FIG. 9 is a structural block diagram of a UE according to an embodiment of the present invention.

Further, in another embodiment of the present invention, as shown in FIG. 9, the receiving unit 12 is further configured to:

receive selection reference parameters sent by the base station, where the selection reference parameters are mapped to a part of nodes or all of nodes among all coordinating nodes.

the UE further includes:

a determining unit 13, configured to: when the selection reference parameters are mapped to a part of nodes among all the coordinating nodes, for a coordinating node that does not have a corresponding selection reference parameter, determine 0 or a predefined value as its selection reference parameter; and a selecting unit 14, configured to: after the CSI information of each coordinating node is acquired and before the UE feeds back all information or a part of information in the acquired CSI information to the base station, select, according to the selection reference parameters and from the acquired CSI information of each coordinating node, CSI information that needs to be fed back to the base station; and accordingly, the feedback unit 11 is specifically configured to feed back the selected CSI information to the base station.

Further, the feedback unit 11 is further configured to feed back, to the base station, at least one of a resource identifier and a node identifier that correspond to the selected CSI information.

Further, the acquiring unit 10 is specifically configured to measure a channel state of each coordinating node and acquire the CSI information according to the measured channel state; and accordingly, the selecting unit 14 includes:

an acquiring module, configured to acquire the sum of channel state information of each coordinating node and a selection reference parameter that corresponds to each coordinating node;

a sequencing module, configured to sequence the sums of channel state information and selection reference parameters of all coordinating nodes; and a selecting module, further configured to select, according to a result of the sequencing, CSI information of one or more coordinating nodes as the CSI information that needs to be fed back, and preferably configured to select, according to the result of the sequencing, the channel state indicator information of the one or more coordinating nodes as the channel state indicator information that needs to be fed back, where the sum of channel state information and a selection reference parameter of a selected coordinating node is greater than the sum of channel state information and a selection reference parameter of an unselected coordinating node;

or the acquiring unit 10 is specifically configured to measure a channel state of each coordinating node, perform interference compensation on the measured channel state, and acquire the CSI information according to the channel state on which interference compensation has been performed; and accordingly, the selecting unit 14 includes:

an acquiring module, configured to acquire the sum of channel state information of each coordinating node after the interference compensation and a selection reference parameter that corresponds to each coordinating node;

a sequencing module, configured to sequence the sums of channel state information and selection reference parameters of all coordinating nodes; and a selecting module, configured to select, according to a result of the sequencing, CSI information of one or more coordinating nodes as the CSI information that needs to be fed back, and preferably configured to select, according to the result of the sequencing, the channel state indicator information of the one or more coordinating nodes as the channel state indicator information that needs to be fed back, where the sum of channel state information after the interference compensation and a selection reference parameter of a selected coordinating node is greater than the sum of channel state information after the interference compensation and a selection reference parameter of an unselected coordinating node.

Optionally, in another embodiment of the present invention, the receiving unit 12 is further configured to:

receive feedback indicator information sent by the base station or acquire predefined feedback indicator information, where the feedback indicator information is used to indicate the number of coordinating nodes for which the UE needs to feed back CSI information or indicate a feedback threshold;

further, when the feedback indicator information indicates the number of pieces of channel state indicator information that need to be fed back by the user equipment, the selecting module is specifically configured to:

when the feedback indicator information indicates the number of pieces of CSI information that needs to be fed back by the UE, sequentially select at least one coordinating node according to the result of the sequencing and in descending order, where CSI information of the at least one coordinating node is the CSI information that needs to be fed back, and the number of the at least one coordinating node is the number indicated in the feedback indicator information; and further, when the feedback indicator information indicates the feedback threshold, the selecting module is specifically configured to:

when the feedback indicator information indicates the feedback threshold, sequentially select at least one coordinating node according to the result of the sequencing and in descending order, where CSI information of the at least one coordinating node is the CSI information that needs to be fed back, and a difference between the maximum value among the sums of channel state information and selection reference parameters of all coordinating nodes and the sum of the channel state information and a selection reference parameter of the at least one coordinating node is less than the feedback threshold.

The CSI information of one or more coordinating nodes that needs to be fed back includes sub-band CSI information and/or wideband CSI information of the coordinating node.

The measured channel state of each coordinating node is a signal-to-noise ratio, a channel capacity, or channel throughput, and the selection reference parameters correspondingly are signal-to-noise ratio reference parameters, channel capacity reference parameters, or channel throughput reference parameters.

Optionally, in another embodiment of the present invention, the receiving unit 12 is further configured to:

after the feedback unit 11 feeds back all information or a part of information in the acquired CSI information to the base station, receive selection reference parameters sent by the base station and on which the base station performs an adjustment.

The selection reference parameters are independently sent or jointly sent through cell-specific high-layer signaling, UE-specific high-layer signaling, or physical-layer dynamic signaling.

Optionally, in another embodiment of the present invention, the receiving unit 12 is specifically configured to:

receive one or more pieces of downlink control information that indicate data channel transmission, where the multiple pieces of downlink control information received by the UE indicate scheduling information for different coordinating nodes to transmit user data on a same carrier or different carriers, and a coordinating node that sends the downlink control information may be the same as or different from a coordinating node that transmits the user data;

or receive downlink control information that indicates data channel transmission, where the downlink control information includes one or more code word indicators, multiple code words included in the downlink control information are used to indicate code word information for different coordinating nodes to transmit user data on a same carrier or different carriers, and a node that sends the downlink control information may be the same as or different from a node that transmits the user data.

Further, the receiving unit 12 is specifically configured to:

perform, according to the scheduling result notification information and a timing offset that is sent by the base station, synchronization with a coordinating node that transmits a data channel for the UE, and receive data transmitted by the coordinating node that transmits the data channel for the UE;

or perform downlink synchronization according to the scheduling result notification information and synchronization information that is obtained from a synchronization channel of each coordinating node that transmits a data channel for the UE, and receive data transmitted by the coordinating node that transmits the data channel for the UE.

In the embodiments of the present invention, a node identifier of a master node serving the UE, an identifier of a node that transmits data for the UE, or a predefined node identifier is used to perform scrambling code initialization and demodulation pilot initialization for data transmitted by a base station that corresponds to the coordinating node serving the UE, and the UE generates a scrambling code and a demodulation pilot according to the node identifier of the master node serving the UE, the identifier of the node that transmits data for the UE, or the predefined node identifier, and processes data according to the generated scrambling code and demodulation pilot.

Optionally, in another embodiment of the present invention, the receiving unit 12 is further configured to receive indicator signaling sent by the base station, where the indicator signaling is used to indicate whether the node identifier of the master node serving the UE, the identifier of the node that transmits the data for the UE, or the predefined node identifier is used to perform the scrambling code initialization and the demodulation pilot initialization for the data transmitted by the base station that corresponds to the coordinating node serving the UE.

Further, the receiving unit 12 is specifically configured to:

receive node list indicator information and/or extension identifier information sent by the base station, where the node list indicator information is used to indicate a node that transmits a data channel for the UE, and the extension identifier information is used to indicate demodulation pilot information of the data channel.

Further, the receiving unit 12 is specifically configured to:

receive the node list indicator information and/or the extension identifier information that is sent by the base station through a carrier indicator or a transmission indicator;

the receiving unit is specifically configured to:

receive the node list indicator information and/or the extension identifier information that is sent by the base station through the carrier indicator or the transmission indicator; and receive high-layer signaling, where the high-layer signaling indicates that the base station sends the node list indicator information and/or the extension identifier information through the carrier indicator or the transmission indicator;

when the base station sends the node list indicator information and/or the extension identifier information through the carrier indicator, the receiving unit 12 is further configured to:

receive high-layer signaling, where the high-layer signaling indicates that the carrier indicator or the transmission indicator is the node list indicator information and/or the extension identifier information; and when the base station sends the node list indicator information and/or the extension identifier information through the transmission indicator, the receiving unit 12 is further configured to:

receive high-layer signaling, where the high-layer signaling indicates that the transmission indicator is the node list indicator information and/or the extension identifier information; and/or receive high-layer signaling, where the high-layer signaling indicates whether the transmission indicator is sent.

A mapping between the carrier indicator or the transmission indicator and the node list indicator information and/or the extension identifier information is indicated through a bitmap mapping or a state mapping, or indicated in the high-layer signaling.

Further, the receiving unit 12 is specifically configured to:

receive carrier indicator information and the node list indicator information and/or the extension identifier information that are sent by the base station through a hybrid indicator; and the receiving unit 12 is further configured to:

receive high-layer signaling, where the high-layer signaling indicates that the hybrid indicator is the carrier indicator information and the node list indicator information and/or the extension identifier information; and/or receive high-layer signaling, where the high-layer signaling indicates whether the hybrid indicator is sent.

Mappings between the hybrid indicator and the carrier indicator information and between the hybrid indicator and the node list indicator information and/or the extension identifier information are indicated through a bitmap mapping or a state mapping, or indicated in the high-layer signaling.

Optionally, in an embodiment of the present invention, the receiving unit 12 is further configured to:

receive multi-node high-layer signaling, where the multi-node high-layer signaling includes at least one of the following information:

a node identifier corresponding to each coordinating node, the number of pilot ports corresponding to each coordinating node, a pilot location corresponding to each coordinating node, and a data-channel starting location corresponding to each coordinating node;

the receiving unit 12 is specifically configured to:

receive the node list indicator information sent by the base station; and after the node list indicator information sent by the base station is received, the determining unit 13 is further configured to:

determine, according to the node list indicator information and the multi-node high-layer signaling, at least one of the following information:

a node identifier of a node that transmits a data channel for the UE, the number of pilot ports of the node that transmits the data channel for the UE, a pilot location of the node that transmits the data channel for the UE, and a data-channel starting location of the node that transmits the data channel for the UE.

In the embodiments of the present invention, the coordinating node is a cell, a base station, a remote radio head, a remote radio unit, a cell set, or a node set;

when the coordinating node is a base station, a remote radio head, or a remote radio unit, the node identifier is an identifier of the node or an identifier of a cell to which the node belongs; and when the coordinating node is a cell set or a node set, the node identifier is an identifier of the node set or an identifier of the cell set to which the node belongs.

Figure 10:
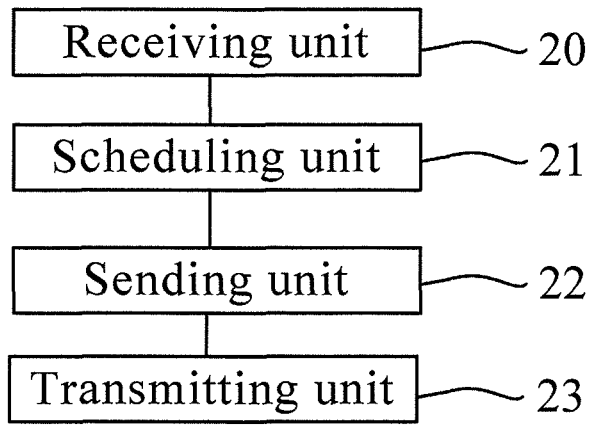
FIG. 10 is a structural block diagram of a base station according to an embodiment of the present invention.

Correspondingly, an embodiment of the present invention further provides a base station for coordinated multi-node transmission. As shown in FIG. 10, the base station includes:

a receiving unit 20, configured to receive CSI information of coordinating nodes that is fed back by a UE;

a scheduling unit 21, configured to perform, according to the CSI information that has been fed back, scheduling on the UE and/or one or more other UEs served by each coordinating node;

a sending unit 22, configured to send scheduling result notification information to the scheduled UE according to a result of the scheduling; and a transmitting unit 23, configured to transmit data to the scheduled UE according to the result of the scheduling.

After the foregoing technical solution is used, according to the base station for coordinated multi-node transmission provided in this embodiment of the present invention, a manner in which multiple cells provide a service in a coordinated manner is used; a UE feeds back CSI information, and each coordinating cell performs scheduling on the UE and/or one or more other UEs served by each coordinating cell, so that at least one coordinating cell serves the UE and/or the one or more other UEs; in one aspect, the UE can feed back channel state information required for achieving a scheduling goal, so that the base station implements scheduling to achieve the scheduling goal; in another aspect, multi-cell coordination is used to provide the service for the UE, and for the UE, a different coordinating cell may transmit data for the UE at a certain period; therefore, a flexible adjustment can be performed on throughput of each coordinating cell through scheduling, that is, each coordinating cell is capable of performing scheduling according to a requirement of an expected scheduling goal and flexibly decreasing or increasing the throughput of each coordinating cell, thereby achieving the objective of flexible optimization of radio communications performance.

Further, in another embodiment of the present invention, the sending unit 22 is further configured to: before the CSI information of the coordinating nodes that is fed back by the UE is received, send measurement indicator information to the UE, where the measurement indicator information is used to indicate whether the UE performs interference compensation on the measured channel state;

before the CSI information of the coordinating nodes that is fed back by the UE is received, send interference compensation resource information to the UE, where the interference compensation resource information is used to indicate interfering-node indicator information or a location of a resource for the UE to perform the interference compensation; and before the CSI information fed back by the UE is received, send selection reference parameters selected for the UE to the UE, where the selection reference parameters are mapped to a part of nodes or all of nodes among all coordinating nodes, and when the selection reference parameters are mapped to a part of all the coordinating nodes, for a coordinating node that does not have a corresponding selection reference parameter, the UE determines 0 or a predefined value as its selection reference parameter.

Accordingly, the receiving unit 20 is specifically configured to receive CSI information selected by the UE according to the selection reference parameters and from the CSI information of each coordinating node, where the CSI information of each coordinating node is acquired by the UE.

The selection reference parameters are independently sent or jointly sent through cell-specific high-layer signaling, UE-specific high-layer signaling, or physical-layer dynamic signaling.

Specifically, the scheduling unit 21 is specifically configured to:

perform, according to channel state indicator information of a local node in the channel state indicator information that has been fed back, scheduling on the user equipment and/or one or more other user equipments served by the local node; and forward channel state indicator information of one or more other coordinating nodes to a base station that corresponds to the one or more other coordinating nodes, where the channel state indicator information of the one or more other coordinating nodes is in the channel state indicator information that has been fed back, so that the base station that corresponds to the one or more other coordinating nodes performs, according to the channel state indicator information that corresponds to the one or more other coordinating nodes, scheduling on a user equipment served by the one or more other coordinating nodes.

Figure 11:
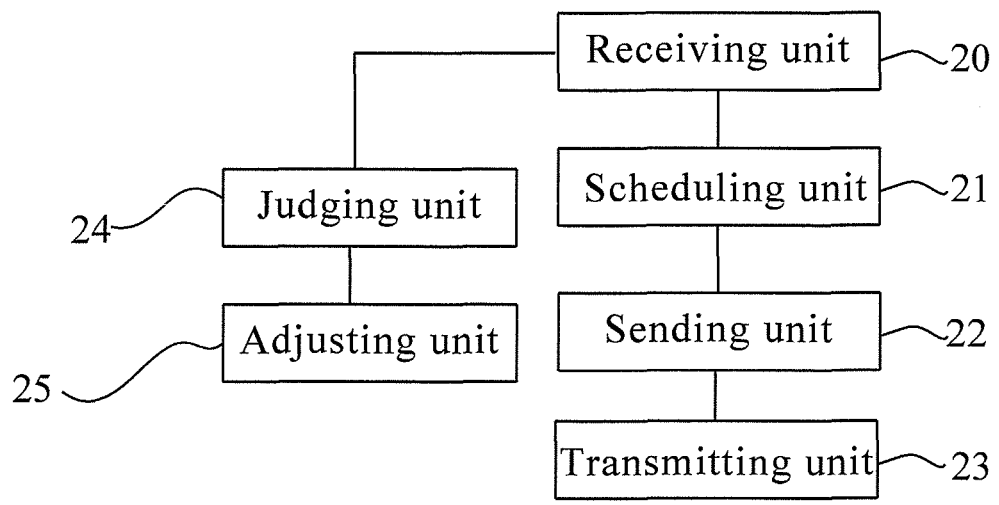
FIG. 11 is a structural block diagram of a base station according to an embodiment of the present invention.

Further, the sending unit 22 is further configured to send scheduling-related information to the one or more other coordinating nodes after the scheduling is performed, according to the CSI information that has been fed back, on the UE and/or the one or more other UEs served by each coordinating node;

the receiving unit 20 is further configured to receive scheduling-related information of the one or more other coordinating nodes after the scheduling is performed, according to the CSI information that has been fed back, on the UE and/or the one or more other UEs served by each coordinating node; and further, in another embodiment of the present invention, as shown in FIG. 11, the base station further includes:

a judging unit 24, configured to: after the scheduling is performed, according to the CSI information that has been fed back, on the UE and/or the one or more other UEs served by each coordinating node, determine, according to the scheduling-related information of the one or more other coordinating nodes and scheduling-related information of a local coordinating node, whether a scheduling stop condition is satisfied; and an adjusting unit 25, configured to: when the scheduling stop condition is not satisfied, adjust the selection reference parameters selected for the UE;

or further, when the scheduling stop condition is satisfied, adjust the selection reference parameters selected for the UE, for use in next scheduling.

Further, the sending unit 22 is further configured to send the adjusted selection reference parameters to the UE, where:

the scheduling-related information includes one or more of the following information: scheduling result information, information of a node-served user, and channel state information of the node-served user.

Further, the adjusting unit 25 is specifically configured to:

increase or decrease the original selection reference parameters selected for the UE.

Figure 12:
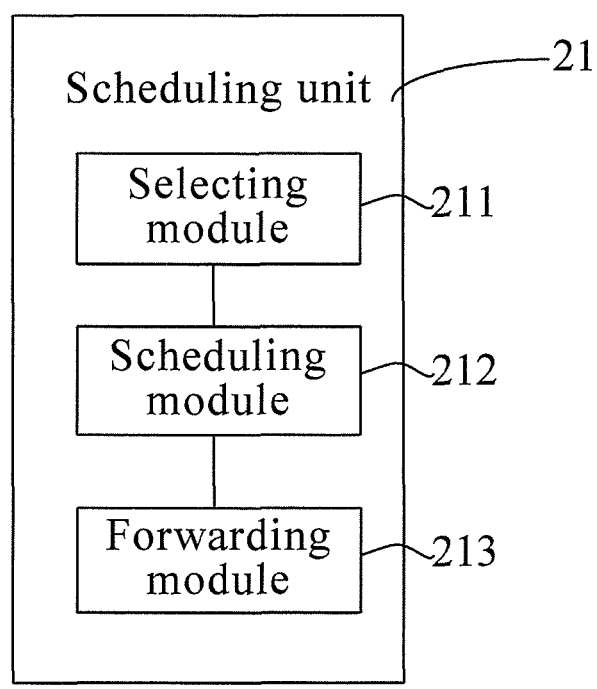
FIG. 12 is a structural block diagram of a base station according to an embodiment of the present invention.

As shown in FIG. 12, in another embodiment of the present invention, the scheduling unit 21 includes:

a selecting module 211, configured to select, according to the selection reference parameters selected for the UE and from the CSI information of the coordinating nodes that has been fed back, CSI information used by the local coordinating node for scheduling and CSI information used by the one or more other coordinating nodes for scheduling, where the selection reference parameters are mapped to a part of nodes or all of nodes among all coordinating nodes, and when the selection reference parameters are mapped to a part of all the coordinating nodes, for a coordinating node that does not have a corresponding selection reference parameter, a selection reference parameter of the coordinating node is 0 or a predefined value;

a scheduling module 212, configured to perform, according to the selected CSI information used by the local coordinating node for scheduling, scheduling on the UE and/or the one or more other UEs served by the local node; and a forwarding module 213, configured to forward the selected CSI information used by the one or more other coordinating nodes for scheduling to a base station that corresponds to the one or more other coordinating nodes, so that the base station that corresponds to the one or more other coordinating nodes performs, according to the CSI information that corresponds to the one or more other coordinating nodes, scheduling on the UE served by the one or more other coordinating nodes.

The CSI information that has been fed back includes channel state information; and further, the selecting module 211 is specifically configured to acquire, for each coordinating node, the sum of channel state information of a corresponding coordinating node and a selection reference parameter of the corresponding coordinating node;

sequence the sums of channel state information and selection reference parameters of all coordinating nodes; and select, according to a result of the sequencing, the CSI information used by the local coordinating node for scheduling and the CSI information used by the one or more other coordinating nodes for scheduling, and preferably select, according to the result of the sequencing, the channel state indicator information used by the local coordinating node for scheduling and the channel state indicator information used by the one or more other coordinating nodes for scheduling, where the sum of channel state information and a selection reference parameter of a selected coordinating node is greater than the sum of channel state information and a selection reference parameter of an unselected coordinating node.

The channel state information is a signal-to-noise ratio, a channel capacity, or channel throughput, and the selection reference parameters correspondingly are signal-to-noise ratio reference parameters, channel capacity reference parameters, or channel throughput reference parameters.

Further, the scheduling module 212 is further configured to:

send scheduling-related information of the local coordinating node to the one or more other coordinating nodes;

receive scheduling-related information of the one or more other coordinating nodes, where the scheduling-related information of the one or more other coordinating nodes corresponds to the selected CSI information;

determine, according to the scheduling-related information of the one or more other coordinating nodes and scheduling-related information of the local coordinating node, whether a scheduling stop condition is satisfied; and if the scheduling stop condition is not satisfied, adjust the selection reference parameters, where the scheduling-related information includes one or more of the following information:

scheduling result information, information of a node-served user, and channel state information of the node-served user.

Further, the scheduling module 212 is further configured to:

after the selection reference parameters are adjusted, select, according to the adjusted selection reference parameters and from the CSI information that has been fed back, the CSI information used by the local coordinating node for scheduling and the CSI information used by the one or more other coordinating nodes for scheduling;

perform, according to the selected CSI information used by the local coordinating node for scheduling, re-scheduling on the UE and/or one or more other UEs served by the local node; and forward the selected CSI information used by the one or more other coordinating nodes for scheduling to a base station that corresponds to the one or more other coordinating nodes, so that the base station that corresponds to the one or more other coordinating nodes performs, according to the CSI information that corresponds to the one or more other coordinating nodes, re-scheduling on the UE served by the one or more other coordinating nodes.

The scheduling stop condition is one of the following: a re-scheduling times threshold is reached, a difference or a ratio between scheduling goals during two consecutive times of scheduling reaches a specified range, and a scheduling goal is achieved.

The adjusting the selection reference parameters includes: increasing or decreasing the original selection reference parameters.

In an embodiment of the present invention:

the scheduling-related information is information of a node-served user, where the information of the node-served user includes the average number of users that need to be served by a coordinating node;

the scheduling goal is that a ratio of the average number of users that need to be served by a first node to the average number of users that need to be served by a second node is less than a first specified threshold and/or greater than a second specified threshold; and the adjusting, by the scheduling module 212, the selection reference parameters includes:

if the ratio of the average number of users that need to be served by the first node to the average number of users that need to be served by the second node is greater than the first specified threshold, decreasing a selection reference parameter of the first node and/or increasing a selection reference parameter of the second node; and if the ratio of the average number of users that need to be served by the first node to the average number of users that need to be served by the second node is less than the second specified threshold, increasing the selection reference parameter of the first node and/or decreasing the selection reference parameter of the second node;

or the scheduling-related information is information of a node-served user, where the information of the node-served user includes the total number of users that need to be served by a node;

the scheduling goal is that a ratio of the total number of users that need to be served by a first node to the total number of users that need to be served by a second node is less than a first specified threshold and/or greater than a second specified threshold; and the adjusting, by the scheduling module 212, the selection reference parameters includes:

if the ratio of the total number of users that need to be served by the first node to the total number of users that need to be served by the second node is greater than the first specified threshold, decreasing a selection reference parameter of the first node and/or increasing a selection reference parameter of the second node; and if the ratio of the total number of users that need to be served by the first node to the total number of users that need to be served by the second node is less than the second specified threshold, increasing the selection reference parameter of the first node and/or decreasing the selection reference parameter of the second node;

or the scheduling-related information is information of a node-served user, where the information of the node-served user includes node-edge user throughput or average node throughput;

the scheduling goal is that a ratio of node-edge user throughput or average node throughput of a first node to node-edge user throughput or average node throughput of a second node is less than a first specified threshold and/or greater than a second specified threshold; and the adjusting, by the scheduling module 212, the selection reference parameters includes:

if the ratio of node-edge user throughput or average node throughput of the first node to node-edge user throughput or average node throughput of the second node is greater than the first specified threshold, increasing a selection reference parameter of the first node and/or decreasing a selection reference parameter of the second node; and if the ratio of node-edge user throughput or average node throughput of the first node to node-edge user throughput or average node throughput of the second node is less than the second specified threshold, decreasing the selection reference parameter of the first node and/or increasing the selection reference parameter of the second node;

or the scheduling-related information is information of a node-served user, where the information of the node-served user includes node-edge user throughput, average node throughput, or an average priority of node-served users;

the scheduling goal is that the sum of node-edge user throughput, average node throughput, or average priorities of node-served users of multiple coordinating nodes is greater than a specified threshold or reaches an upper limit; and the adjusting, by the scheduling module 212, the selection reference parameters includes:

if, after a selection reference parameter of one or more coordinating nodes thereof is decreased or increased, the sum of node-edge user throughput, average node throughput, or average priorities of node-served users of the multiple coordinating nodes is increased, decreasing or increasing the selection reference parameter of the one or more coordinating nodes; and if, after the selection reference parameter of one or more coordinating nodes thereof is decreased or increased, the sum of node-edge user throughput, average node throughput, or average priorities of node-served users of the multiple coordinating nodes is decreased or unchanged, not changing, increasing, or decreasing the selection reference parameter of the one or more coordinating nodes;

or the scheduling-related information is state information of channels from the user equipment to the nodes;

the scheduling goal is that throughput of the user equipment is greater than a certain specified threshold; and the adjusting, by the scheduling module 212, the selection reference parameters includes:

if the first node is capable of providing larger throughput for the user equipment relative to the second node, and the throughput of the user equipment is less than the certain specified threshold, increasing a selection reference parameter of the user equipment relative to the first node and/or decreasing a selection reference parameter of the user equipment relative to the second node; and if the second node is capable of providing larger throughput for the user equipment relative to the first node, and the throughput of the user equipment is less than the certain specified threshold, increasing a selection reference parameter of the user equipment relative to the second node and/or decreasing a selection reference parameter of the user equipment relative to the first node;

or the scheduling-related information is state information of channels from the user equipment to the nodes;

the scheduling goal is that throughput of the user equipment is less than a certain specified threshold; and the adjusting, by the scheduling module 212, the selection reference parameters includes:

if the first node is capable of providing larger throughput for the user equipment relative to the second node, and the throughput of the user equipment is greater than the certain specified threshold, decreasing a selection reference parameter of the user equipment relative to the first node and/or increasing a selection reference parameter of the user equipment relative to the second node; and if the second node is capable of providing larger throughput for the user equipment relative to the first node, and the throughput of the user equipment is greater than the certain specified threshold, decreasing a selection reference parameter of the user equipment relative to the second node and/or increasing a selection reference parameter of the user equipment relative to the first node, where the first node is one or more coordinating nodes, and the second node is one or more coordinating nodes.

Further, in still another embodiment of the present invention, the scheduling module 212 is specifically configured to:

send scheduling-related information to the one or more other coordinating nodes;

receive scheduling-related information of the one or more other coordinating nodes, where the scheduling-related information of the one or more other coordinating nodes corresponds to the selected CSI information, and the scheduling-related information includes scheduling result information;

adjust, according to the scheduling result information, the CSI information fed back by the UE;

determine whether a scheduling stop condition is satisfied; and if the scheduling stop condition is not satisfied:

select, according to the adjusted CSI information and from the adjusted CSI information, the CSI information used by the local coordinating node for scheduling and the CSI information used by the one or more other coordinating nodes for scheduling, so as to perform, according to the selected CSI information used by the local coordinating node for scheduling, re-scheduling on the UE and/or one or more other UEs served by the local node; and forward the selected CSI information used by the one or more other coordinating nodes for scheduling to a base station that corresponds to the one or more other coordinating nodes, so that the base station that corresponds to the one or more other coordinating nodes performs, according to the CSI information that corresponds to the one or more other coordinating nodes, re-scheduling on the UE served by the one or more other coordinating nodes;

or select, according to the adjusted CSI information and selection reference parameters and from the adjusted CSI information, the CSI information used by the local coordinating node for scheduling and the CSI information used by the one or more other coordinating nodes for scheduling, so as to perform, according to the selected CSI information used by the local coordinating node for scheduling, re-scheduling on the UE and/or the one or more other UEs served by the local node; and forward the selected CSI information used by the one or more other coordinating nodes for scheduling to a base station that corresponds to the one or more other coordinating nodes, so that the base station that corresponds to the one or more other coordinating nodes performs, according to the CSI information that corresponds to the one or more other coordinating nodes, re-scheduling on the UE served by the one or more other coordinating nodes.

Further, in still another embodiment of the present invention, the scheduling unit 21 is specifically configured to:

calculate, according to the CSI information fed back by the UE and CSI information fed back by one or more other UEs served by each coordinating node, a scheduling priority of each UE in each dimension including a time domain, a frequency domain, and a node domain; and according to the scheduling priority of each UE in each dimension including the time domain, the frequency domain, and the node domain, allocate a node and a time/frequency resource to each UE to serve the UE, or select, for each time/frequency resource of each coordinating node, a UE or a UE group that needs to be served.

Further, in still another embodiment of the present invention, the scheduling unit 21 is specifically configured to:

from all scheduling priorities in all dimensions including the time domain, the node domain, the frequency domain and the node domain, or the time domain and the node domain, select a time domain resource or a frequency domain resource of a node with the highest priority to allocate the resource to a user equipment with the highest priority.

Further, in still another embodiment of the present invention, the scheduling unit 21 is further configured to:

determine, according to the serving node and the time/frequency resource that are allocated to each user equipment or according to the UE or the UE group that needs to be served and is selected for each time/frequency resource of each coordinating node, whether a scheduling stop condition is satisfied;

or further, when the scheduling stop condition is satisfied, adjust a proportional fairness factor for use in next scheduling;

adjust, according to the adjusted proportional fairness factor, the scheduling priority of each UE in each dimension including the time domain, the frequency domain, the node domain, the frequency domain and the node domain, or the time domain and the node domain; and according to the adjusted scheduling priority of each user equipment in each dimension including the time domain, the frequency domain, the node domain, the frequency domain and the node domain, or the time domain and the node domain, re-allocate a node and a time/frequency resource to each user equipment to serve the user equipment, or re-select, for each time/frequency resource of each coordinating node, a user equipment or a user equipment group that needs to be served.

The scheduling stop condition is one of the following: a re-scheduling times threshold is reached, a difference or a ratio between scheduling goals during two consecutive times of scheduling reaches a specified range, and a scheduling goal is achieved.

In an embodiment of the present invention:

the scheduling goal is that a ratio of the average number of users that need to be served by a first node to the average number of users that need to be served by a second node is less than a first specified threshold and/or greater than a second specified threshold; and the adjusting, by the scheduling unit 21, the proportional fairness factor includes:

if the ratio of the average number of users that need to be served by the first node to the average number of users that need to be served by the second node is greater than the first specified threshold, decreasing a proportional fairness factor of the first node and/or increasing a proportional fairness factor of the second node; and if the ratio of the average number of users that need to be served by the first node to the average number of users that need to be served by the second node is less than the second specified threshold, increasing the proportional fairness factor of the first node and/or decreasing the proportional fairness factor of the second node;

or the scheduling goal is that a ratio of the total number of users that need to be served by a first node to the total number of users that need to be served by a second node is less than a first specified threshold and/or greater than a second specified threshold; and the adjusting, by the scheduling unit 21, the proportional fairness factor includes:

if the ratio of the total number of users that need to be served by the first node to the total number of users that need to be served by the second node is greater than the first specified threshold, decreasing a proportional fairness factor of the first node and/or increasing a proportional fairness factor of the second node; and if the ratio of the total number of users that need to be served by the first node to the total number of users that need to be served by the second node is less than the second specified threshold, increasing the proportional fairness factor of the first node and/or decreasing the proportional fairness factor of the second node;

or the scheduling goal is that a ratio of node-edge user throughput or average node throughput or an average priority of node-served users of a first node to node-edge user throughput or average node throughput of the second node is less than a first specified threshold and/or greater than a second specified threshold; and the adjusting, by the scheduling unit 21, the proportional fairness factor includes:

if the ratio of node-edge user throughput or average node throughput of the first node to node-edge user throughput or average node throughput of the second node is greater than the first specified threshold, increasing a proportional fairness factor of the first node and/or increasing a proportional fairness factor of the second node; and if the ratio of node-edge user throughput or average node throughput of the first node to node-edge user throughput or average node throughput of the second node is less than the second specified threshold, decreasing the proportional fairness factor of the first node and/or decreasing the proportional fairness factor of the second node;

or the scheduling goal is that a ratio of an average priority of node-served users of a first node to an average priority of node-served users of a second node is less than a first specified threshold and/or greater than a second specified threshold; and the adjusting, by the scheduling unit 21, the proportional fairness factor includes:

if the ratio of the average priority of node-served users of the first node to the average priority of node-served users of the second node is greater than the first specified threshold, decreasing a proportional fairness factor of the first node and/or increasing a proportional fairness factor of the second node; and if the ratio of the average priority of node-served users of the first node to the average priority of node-served users of the second node is less than the second specified threshold, increasing the proportional fairness factor of the first node and/or decreasing the proportional fairness factor of the second node;

or the scheduling goal is that the sum of node-edge user throughput, average node throughput, or average priorities of node-served users of multiple coordinating nodes is greater than a specified threshold or reaches an upper limit; and the adjusting, by the scheduling unit 21, the proportional fairness factor includes:

if, after a proportional fairness factor of one or more coordinating nodes thereof is decreased or increased, the sum of node-edge user throughput, average node throughput, or average priorities of node-served users of the multiple coordinating nodes is increased, decreasing or increasing the proportional fairness factor of the one or more coordinating nodes; and if, after the proportional fairness factor of the one or more coordinating nodes thereof is decreased or increased, the sum of node-edge user throughput, average node throughput, or average priorities of node-served users of the multiple coordinating nodes is decreased or unchanged, not changing, increasing, or decreasing the proportional fairness factor of the one or more coordinating nodes;

or the scheduling goal is that throughput of the user equipment is greater than a certain specified threshold; and the adjusting, by the scheduling unit, the proportional fairness factor includes:

increasing a proportional fairness factor of the user equipment relative to all coordinating nodes; or if the first node is capable of providing larger throughput for the user equipment relative to the second node, and the throughput of the user equipment is less than the certain specified threshold, increasing a proportional fairness factor of the user equipment relative to the first node and/or decreasing a proportional fairness factor of the user equipment relative to the second node; and if the second node is capable of providing larger throughput for the user equipment relative to the first node, and the throughput of the user equipment is less than the certain specified threshold, increasing a proportional fairness factor of the user equipment relative to the second node and/or decreasing a proportional fairness factor of the user equipment relative to the first node;

or the scheduling goal is that throughput of the user equipment is less than a certain specified threshold; and the adjusting, by the scheduling unit 21, the proportional fairness factor includes:

decreasing a proportional fairness factor of the user equipment relative to all coordinating nodes; or if the first node is capable of providing larger throughput for the user equipment relative to the second node, and the throughput of the user equipment is greater than the certain specified threshold, decreasing a proportional fairness factor of the user equipment relative to the first node and/or increasing a proportional fairness factor of the user equipment relative to the second node; and if the second node is capable of providing larger throughput for the user equipment relative to the first node, and the throughput of the user equipment is greater than the certain specified threshold, decreasing a proportional fairness factor of the user equipment relative to the second node and/or increasing a proportional fairness factor of the user equipment relative to the first node, where:

the first node is one or more coordinating nodes, and the second node is one or more coordinating nodes.

Further, the sending unit 22 is specifically configured to: send the UE one or more pieces of downlink control information that indicate data channel transmission, where the multiple pieces of downlink control information indicate scheduling information for different nodes to transmit user data on a same carrier or different carriers, and a node that sends the downlink control information may be the same as or different from a node that transmits the user data;

or send downlink control information that indicates data channel transmission to the UE, where the downlink control information includes one or more code word indicators, multiple code words included in the downlink control information are used to indicate code word information for different nodes to transmit user data on a same carrier or different carriers, and a node that sends the downlink control information may be the same as or different from a node that transmits the user data.

Further, in still another embodiment of the present invention, the sending unit 22 is further configured to: send the UE a timing offset corresponding to each coordinating node that sends a data channel for the UE.

In the embodiments of the present invention, a node identifier of a master node serving the UE, a node identifier of a node that transmits data for the UE, or a predefined node identifier is used to perform scrambling code initialization and demodulation pilot initialization for the data transmitted to the UE.

Further, the sending unit 22 is further configured to send indicator signaling, where the indicator signaling is used to indicate whether the node identifier of the master node serving the UE, the identifier of the node that transmits data for the UE, or the predefined node identifier is used to perform the scrambling code initialization and the demodulation pilot initialization for data transmitted by a base station that corresponds to a coordinating node serving the UE.

Further, the sending unit 22 is specifically configured to: send node list indicator information and/or extension identifier information to the UE, where the node list indicator information is used to indicate a node that transmits a data channel for the UE, and the extension identifier information is used to indicate demodulation pilot information of the data channel.

Further, the sending unit 22 is specifically configured to:

send the node list indicator information and/or the extension identifier information to the user equipment through a carrier indicator or a transmission indicator; and send high-layer signaling to the user equipment, where the high-layer signaling indicates that the node list indicator information and/or the extension identifier information is sent through the carrier indicator or the transmission indicator;

when the node list indicator information and/or the extension identifier information is sent through the carrier indicator, the sending unit 22 is further configured to:

send high-layer signaling to the user equipment, where the high-layer signaling indicates that the carrier indicator is the node list indicator information and/or the extension identifier information; and when the node list indicator information and/or the extension identifier information is sent through the transmission indicator, the sending unit 22 is further configured to:

send high-layer signaling to the user equipment, where the high-layer signaling indicates that the transmission indicator is the node list indicator information and/or the extension identifier information; and/or send high-layer signaling to the UE, where the high-layer signaling indicates whether the transmission indicator is sent.

Further, the sending unit 22 is specifically configured to: send carrier indicator information and the node list indicator information and/or the extension identifier information to the UE through a hybrid indicator;

further, the sending unit 22 is further configured to: send high-layer signaling to the UE, where the high-layer signaling indicates that the hybrid indicator is the carrier indicator information and the node list indicator information and/or the extension identifier information; and send high-layer signaling to the UE, where the high-layer signaling indicates whether the hybrid indicator is sent.

Mappings between the hybrid indicator and the carrier indicator information and between the hybrid indicator and the node list indicator information and/or the extension identifier information are indicated through a bitmap mapping or a state mapping, or indicated through a bitmap mapping or a state mapping that is indicated in the high-layer signaling.

Further, in still another embodiment of the present invention, the sending unit 22 is further configured to:

before the node list indicator information is sent to the UE, send multi-node high-layer signaling to the UE, where the multi-node high-layer signaling includes at least one of the following information:

a node identifier corresponding to each coordinating node, the number of pilot ports corresponding to each coordinating node, a pilot location corresponding to each coordinating node, and a data-channel starting location corresponding to each coordinating node.

In the embodiments of the present invention, the coordinating node is a cell, a base station, a remote radio head, a remote radio unit, a cell set, or a node set;

when the coordinating node is a base station, a remote radio head, or a remote radio unit, the node identifier is an identifier of the node or an identifier of a cell to which the node belongs; and when the coordinating node is a cell set or a node set, the node identifier is an identifier of the node set or an identifier of the cell set to which the node belongs.

A person of ordinary skill in the art may understand that, all or a part of the processes of the foregoing method embodiments may be implemented by a computer program instructing relevant hardware. The foregoing program may be stored in a computer readable storage medium. When the program runs, the steps of the foregoing method embodiments are performed. The foregoing storage medium may include any medium that is capable of storing program code, such as a ROM, a RAM, a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for coordinated multi-node transmission, the method comprising:

acquiring, by a user equipment, channel state indicator information of each coordinating node;

feeding back, by the user equipment, at least some information in the acquired channel state indicator information to a base station, so that each coordinating node performs, according to the channel state indicator information that has been fed back, scheduling on the user equipment and/or one or more other user equipment served by each coordinating node; and if the user equipment is scheduled:

receiving, by the user equipment, scheduling result notification information sent by the base station; and receiving, by the user equipment according to the scheduling result notification information, data transmitted by a base station that corresponds to a coordinating node serving the user equipment;

wherein acquiring, by the user equipment, the channel state indicator information of each coordinating node comprises:

measuring, by the user equipment, a channel state of each coordinating node, and performing interference compensation on the measured channel state; and acquiring, by the user equipment, the channel state indicator information of each coordinating node according to the channel state on which the interference compensation has been performed;

wherein:

the channel state indicator information comprises channel quality indicator information;

measuring, by the user equipment, the channel state of each coordinating node, and performing interference compensation on the measured channel state comprises:

measuring, by the user equipment, interference on a first-category resource element, wherein the first-category resource element is a resource element at the same location as an interference reference signal of a coordinating node to be measured, and the coordinating node to be measured is a coordinating node whose channel state is to be measured;

acquiring, by the user equipment, a location of a second-category resource element, wherein the second-category resource element comprises at least a part of resource elements apart from the first-category resource element;

measuring, by the user equipment, interference on the second-category resource element; and obtaining, by the user equipment, equivalent interference according to the interference on the first-category resource element and the interference on the second-category resource element; and acquiring, by the user equipment, the channel state indicator information of each coordinating node according to the channel state on which the interference compensation has been performed comprises:

acquiring, by the user equipment according to the equivalent interference, channel quality indicator information of the coordinating node to be measured.

2. The method according to claim 1, wherein:

the second-category resource element is a resource element that suffers heavy interference from one or more other coordinating nodes or a resource element that suffers interference at an intensity an absolute value of a difference between which and an intensity of interference suffered by the first-category resource element is greater than a certain threshold; and the heavily-interfering coordinating node is at least one node that is among all coordinating nodes apart from the coordinating node to be measured and whose receive power value, for the user equipment, is greater than receive power values of the other coordinating nodes.

3. The method according to claim 1, wherein before acquiring, by a user equipment, channel state indicator information of each coordinating node, the method further comprises:

receiving, by the user equipment, measurement indicator information sent by the base station, wherein the measurement indicator information is used to indicate whether the user equipment performs interference compensation on the measured channel state.

4. The method according to claim 1, wherein before acquiring, by a user equipment, channel state indicator information of each coordinating node, the method further comprises:

receiving, by the user equipment, interference compensation resource information sent by the base station, wherein the interference compensation resource information is used to indicate interfering-node indicator information or a location of a resource for the user equipment to perform interference compensation; and measuring, by the user equipment, a channel state of each coordinating node, and performing interference compensation on the measured channel state comprises:

measuring, by the user equipment, the channel state of each coordinating node, and performing interference compensation on the measured channel state of a coordinating node or of the resource indicated in the interference compensation resource information.

5. The method according to claim 1, further comprising:

receiving, by the user equipment, selection reference parameters sent by the base station, wherein the selection reference parameters are mapped to a part of nodes or all of nodes among all coordinating nodes; and when the selection reference parameters are mapped to a part of nodes among all the coordinating nodes, for a coordinating node that does not have a corresponding selection reference parameter, determining, by the user equipment, 0 or a predefined value as its selection reference parameter;

after acquiring, by a user equipment, channel state indicator information of each coordinating node and before the feeding back, by the user equipment, at least some information in the acquired channel state indicator information to a base station, the method further comprises:

selecting, by the user equipment according to the selection reference parameters and from the acquired channel state indicator information of each coordinating node, channel state indicator information that needs to be fed back to the base station; and feeding back, by the user equipment, at least some information in the acquired channel state indicator information to a base station comprises:

feeding back, by the user equipment, the selected channel state indicator information to the base station.

6. The method according to claim 5, further comprising:

feeding back, by the user equipment to the base station, at least one of a resource identifier and a node identifier that correspond to the selected channel state indicator information.

7. A method for coordinated multi-node transmission, the method comprising:

acquiring, by a user equipment, channel state indicator information of each coordinating node;

feeding back, by the user equipment, at least some information in the acquired channel state indicator information to a base station, so that each coordinating node performs, according to the channel state indicator information that has been fed back, scheduling on the user equipment and/or one or more other user equipment served by each coordinating node;

if the user equipment is scheduled:

receiving, by the user equipment, scheduling result notification information sent by the base station; and receiving, by the user equipment according to the scheduling result notification information, data transmitted by a base station that corresponds to a coordinating node serving the user equipment;

receiving, by the user equipment, selection reference parameters sent by the base station, wherein the selection reference parameters are mapped to a part of nodes or all of nodes among all coordinating nodes; and when the selection reference parameters are mapped to a part of nodes among all the coordinating nodes, for a coordinating node that does not have a corresponding selection reference parameter, determining, by the user equipment, 0 or a predefined value as its selection reference parameter;

after acquiring, by a user equipment, channel state indicator information of each coordinating node and before the feeding back, by the user equipment, at least some information in the acquired channel state indicator information to a base station, the method further comprises:

selecting, by the user equipment according to the selection reference parameters and from the acquired channel state indicator information of each coordinating node, channel state indicator information that needs to be fed back to the base station; and feeding back, by the user equipment, at least some information in the acquired channel state indicator information to a base station comprises:

feeding back, by the user equipment, the selected channel state indicator information to the base station;

acquiring, by a user equipment, channel state indicator information of each coordinating node comprises:

measuring, by the user equipment, the channel state of each coordinating node, and performing interference compensation on the measured channel state; and acquiring, by the user equipment, the channel state indicator information according to the channel state on which the interference compensation has been performed; and selecting, by the user equipment according to the selection reference parameters and from the acquired channel state indicator information of each coordinating node, channel state indicator information that needs to be fed back to the base station comprises:

acquiring, by the user equipment, the sum of channel state information of each coordinating node after the interference compensation and a selection reference parameter that corresponds to each coordinating node;

sequencing, by the user equipment, the sums of channel state information and selection reference parameters of all coordinating nodes; and selecting, by the user equipment according to a result of the sequencing, channel state indicator information of one or more coordinating nodes as the channel state indicator information that needs to be fed back, or selecting, according to a result of the sequencing, channel state indicator information of the one or more coordinating nodes as the channel state indicator information that needs to be fed back, wherein the sum of channel state information after the interference compensation and a selection reference parameter of a selected coordinating node is greater than the sum of channel state information after the interference compensation and a selection reference parameter of an unselected coordinating node.

8. The method according to claim 7, further comprising:
receiving, by the user equipment, feedback indicator information sent by the base station, or acquiring predefined feedback indicator information, wherein the feedback indicator information is used to indicate the number of coordinating nodes for which the user equipment needs to feed back channel state indicator information or indicate a feedback threshold;

when the feedback indicator information indicates the number of pieces of channel state indicator information that need to be fed back by the user equipment, selecting, by the user equipment according to a result of the sequencing, channel state indicator information of one or more coordinating nodes as the channel state indicator information that needs to be fed back comprises:

sequentially selecting, by the user equipment, at least one coordinating node according to the result of the sequencing and in descending order, wherein channel state indicator information of the at least one coordinating node is the channel state indicator information that needs to be fed back, and the number of the at least one coordinating node is the number indicated in the feedback indicator information; and when the feedback indicator information indicates a feedback threshold, selecting, by the user equipment according to a result of the sequencing, channel state indicator information of one or more coordinating nodes as the channel state indicator information that needs to be fed back comprises:

sequentially selecting, by the user equipment, at least one coordinating node according to the result of the sequencing and in descending order, wherein channel state indicator information of the at least one coordinating node is the channel state indicator information that needs to be fed back, and a difference between the maximum value among the sums of channel state information and selection reference parameters of all coordinating nodes and the sum of the channel state information and a selection reference parameter of the at least one coordinating node is less than the feedback threshold.

9. The method according to claim 7, wherein the channel state indicator information of the one or more coordinating nodes that needs to be fed back comprises sub-band channel state indicator information and/or wideband channel state indicator information of the coordinating node.

10. The method according to claim 7, wherein:
the measured channel state is: a signal-to-noise ratio, a channel capacity, or channel throughput, and the selection reference parameters correspondingly are signal-to-noise ratio reference parameters, channel capacity reference parameters, or channel throughput reference parameters.

11. The method according to claim 5, wherein after feeding back, by the user equipment, the information in the acquired channel state indicator information to a base station, the method further comprises:
receiving, by the user equipment, selection reference parameters that are sent by the base station and on which the base station performs an adjustment.

12. The method according to claim 5, wherein the selection reference parameters are independently sent or jointly sent through cell-specific high-layer signaling, user equipment-specific high-layer signaling, or physical-layer dynamic signaling.

13. The method according to claim 1, wherein receiving, by the user equipment, scheduling result notification information sent by the base station comprises:
receiving, by the user equipment, one or more pieces of downlink control information that indicate data channel transmission, wherein the one or more pieces of downlink control information received by the user equipment indicate scheduling information for different coordinating nodes to transmit user data on a same carrier or different carriers, and a coordinating node that sends the downlink control information may be the same as or different from a coordinating node that transmits the user data; or receiving, by the user equipment, downlink control information that indicates data channel transmission, wherein the downlink control information comprises one or more code word indicators, multiple code words comprised in the downlink control information are used to indicate code word information for different coordinating nodes to transmit user data on a same carrier or different carriers, and a node that sends the downlink control information may be the same as or different from a node that transmits the user data.

14. The method according to claim 1, wherein receiving, by the user equipment according to the scheduling result notification information, data transmitted by a base station that corresponds to a coordinating node serving the user equipment comprises:
perfuming, by the user equipment according to the scheduling result notification information and a timing offset that is sent by the base station, synchronization with a coordinating node that transmits a data channel for the user equipment, and receiving data transmitted by the coordinating node that transmits the data channel for the user equipment;

or performing, by the user equipment, downlink synchronization according to the scheduling result notification information and synchronization information that is obtained from a synchronization channel of each coordinating node that transmits a data channel for the user equipment, and receiving data transmitted by the coordinating node that transmits the data channel for the user equipment.

15. The method according to claim 1, wherein:

a node identifier of a master node serving the user equipment, an identifier of a node that transmits data for the user equipment, or a predefined node identifier is used to perform scrambling code initialization and demodulation pilot initialization for the data transmitted by the base station that corresponds to the coordinating node serving the user equipment, and the user equipment generates a scrambling code and a demodulation pilot according to the node identifier of the master node serving the user equipment, the identifier of the node that transmits data for the user equipment, or the predefined node identifier, and processes data according to the generated scrambling code and demodulation pilot.

16. The method according to claim 15, further comprising:

receiving, by the user equipment, indicator signaling sent by the base station, wherein the indicator signaling is used to indicate whether the node identifier of the master node serving the user equipment, the identifier of the node that transmits data for the user equipment, or the predefined node identifier is used to perform the scrambling code initialization and the demodulation pilot initialization for the data transmitted by the base station that corresponds to the coordinating node serving the user equipment.

17. The method according to claim 1, wherein receiving, by the user equipment, scheduling result notification information sent by the base station comprises:

receiving, by the user equipment, node list indicator information and/or extension identifier information sent by the base station, wherein the node list indicator information is used to indicate a node that transmits a data channel for the user equipment, and the extension identifier information is used to indicate demodulation pilot information of a channel that transmits data for the user equipment.

18. A method for coordinated multi-node transmission, the method comprising:

acquiring, by a user equipment, channel state indicator information of each coordinating node;

feeding back, by the user equipment, at least some information in the acquired channel state indicator information to a base station, so that each coordinating node performs, according to the channel state indicator information that has been fed back, scheduling on the user equipment and/or one or more other user equipment served by each coordinating node; and if the user equipment is scheduled:

receiving, by the user equipment, scheduling result notification information sent by the base station; and receiving, by the user equipment according to the scheduling result notification information, data transmitted by a base station that corresponds to a coordinating node serving the user equipment;

wherein acquiring, by the user equipment, the channel state indicator information of each coordinating node comprises:

measuring, by the user equipment, a channel state of each coordinating node, and performing interference compensation on the measured channel state; and acquiring, by the user equipment, the channel state indicator information of each coordinating node according to the channel state on which the interference compensation has been performed;

wherein:

the channel state indicator information comprises channel quality indicator information;

measuring, by the user equipment, a channel state of each coordinating node, and performing interference compensation on the measured channel state comprises:

measuring, by the user equipment, a signal-to-noise ratio on a first-category resource element, wherein the first-category resource element is a resource element at the same location as an interference reference signal of a coordinating node to be measured, and the coordinating node to be measured is a coordinating node whose channel state is to be measured;

acquiring, by the user equipment, a location of a second-category resource element, wherein the second-category resource element comprises at least a part of resource elements apart from the first-category resource element;

measuring, by the user equipment, a signal-to-noise ratio on the second-category resource element; and obtaining, by the user equipment, an equivalent signal-to-noise ratio according to the signal-to-noise ratio on the first-category resource element and the signal-to-noise ratio on the second-category resource element.

19. A method for coordinated multi-node transmission, the method comprising:

acquiring, by a user equipment, channel state indicator information of each coordinating node;

feeding back, by the user equipment, at least some information in the acquired channel state indicator information to a base station, so that each coordinating node performs, according to the channel state indicator information that has been fed back, scheduling on the user equipment and/or one or more other user equipment served by each coordinating node; and if the user equipment is scheduled:

receiving, by the user equipment, scheduling result notification information sent by the base station; and receiving, by the user equipment according to the scheduling result notification information, data transmitted by a base station that corresponds to a coordinating node serving the user equipment;

wherein acquiring, by the user equipment, the channel state indicator information of each coordinating node comprises:

measuring, by the user equipment, a channel state of each coordinating node, and performing interference compensation on the measured channel state; and acquiring, by the user equipment, the channel state indicator information of each coordinating node according to the channel state on which the interference compensation has been performed;

wherein:

the channel state indicator information comprises channel quality indicator information;

measuring, by the user equipment, a channel state of each coordinating node, and performing interference compensation on the measured channel state comprises:
    measuring, by the user equipment, a signal-to-noise ratio on a first-category resource element; and
    performing, by the user equipment, an adjustment on the signal-to-noise ratio on the first-category resource element according to signal-to-noise ratio adjustment signaling received from the base station, so as to obtain an equivalent signal-to-noise ratio; and
acquiring, by the user equipment, the channel state indicator information of each coordinating node according to the channel state on which the interference compensation has been performed comprises:
    acquiring, by the user equipment, channel quality indicator information of the coordinating node to be measured according to the equivalent signal-to-noise ratio.

20. A method for coordinated multi-node transmission, the method comprising:
acquiring, by a user equipment, channel state indicator information of each coordinating node;
feeding back, by the user equipment, at least some information in the acquired channel state indicator information to a base station, so that each coordinating node performs, according to the channel state indicator information that has been fed back, scheduling on the user equipment and/or one or more other user equipment served by each coordinating node;
if the user equipment is scheduled:
    receiving, by the user equipment, scheduling result notification information sent by the base station; and
    receiving, by the user equipment according to the scheduling result notification information, data transmitted by a base station that corresponds to a coordinating node serving the user equipment;
receiving, by the user equipment, selection reference parameters sent by the base station, wherein the selection reference parameters are mapped to a part of nodes or all of nodes among all coordinating nodes; and
when the selection reference parameters are mapped to a part of nodes among all the coordinating nodes, for a coordinating node that does not have a corresponding selection reference parameter, determining, by the user equipment, 0 or a predefined value as its selection reference parameter;
after acquiring, by a user equipment, channel state indicator information of each coordinating node and before the feeding back, by the user equipment, at least some information in the acquired channel state indicator information to a base station, the method further comprises:
    selecting, by the user equipment according to the selection reference parameters and from the acquired channel state indicator information of each coordinating node, channel state indicator information that needs to be fed back to the base station; and
feeding back, by the user equipment, at least some information in the acquired channel state indicator information to a base station comprises:
    feeding back, by the user equipment, the selected channel state indicator information to the base station;
wherein:
    acquiring, by a user equipment, channel state indicator information of each coordinating node comprises:
        measuring, by the user equipment, the channel state of each coordinating node; and
        acquiring, by the user equipment, the channel state indicator information according to the measured channel state; and
    selecting, by the user equipment according to the selection reference parameters and from the acquired channel state indicator information of each coordinating node, channel state indicator information that needs to be fed back to the base station comprises:
        acquiring, by the user equipment, the sum of channel state information of each coordinating node and a selection reference parameter that corresponds to each coordinating node;
        sequencing, by the user equipment, the sums of channel state information and selection reference parameters of all coordinating nodes; and
        selecting, by the user equipment according to a result of the sequencing, channel state indicator information of one or more coordinating nodes as the channel state indicator information that needs to be fed back, or selecting, according to a result of the sequencing, channel state indicator information of the one or more coordinating nodes as the channel state indicator information that needs to be fed back, wherein the sum of channel state information and a selection reference parameter of a selected coordinating node is greater than the sum of channel state information and a selection reference parameter of an unselected coordinating node.

21. The method according to claim 20, further comprising:
receiving, by the user equipment, feedback indicator information sent by the base station, or acquiring predefined feedback indicator information, wherein the feedback indicator information is used to indicate the number of coordinating nodes for which the user equipment needs to feed back channel state indicator information or indicate a feedback threshold;
when the feedback indicator information indicates the number of pieces of channel state indicator information that need to be fed back by the user equipment, selecting, by the user equipment according to a result of the sequencing, channel state indicator information of one or more coordinating nodes as the channel state indicator information that needs to be fed back comprises:
    sequentially selecting, by the user equipment, at least one coordinating node according to the result of the sequencing and in descending order, wherein channel state indicator information of the at least one coordinating node is the channel state indicator information that needs to be fed back, and the number of the at least one coordinating node is the number indicated in the feedback indicator information; and
when the feedback indicator information indicates a feedback threshold, selecting, by the user equipment according to a result of the sequencing, channel state indicator information of one or more coordinating nodes as the channel state indicator information that needs to be fed back comprises:
    sequentially selecting, by the user equipment, at least one coordinating node according to the result of the sequencing and in descending order, wherein channel state indicator information of the at least one coordinating node is the channel state indicator information that needs to be fed back, and a difference between the maximum value among the sums of channel state information and selection reference parameters of all coordinating nodes and the sum of the channel state information and a selection reference parameter of the at least one coordinating node is less than the feedback threshold.

22. The method according to claim 20, wherein the channel state indicator information of the one or more coordinating nodes that needs to be fed back comprises sub-band channel state indicator information and/or wideband channel state indicator information of the coordinating node.

23. The method according to claim 20, wherein:
the measured channel state is: a signal-to-noise ratio, a channel capacity, or channel throughput, and the selection reference parameters correspondingly are signal-to-noise ratio reference parameters, channel capacity reference parameters, or channel throughput reference parameters.

* * * * *